(12) United States Patent
Matsuzaki et al.

(10) Patent No.: US 7,091,261 B1
(45) Date of Patent: Aug. 15, 2006

(54) YELLOW HUE COMPOUND AND AQUEOUS INK FOR INK-JET RECORDING SYSTEM USING THE SAME

(75) Inventors: Yoriaki Matsuzaki, Chiba (JP); Tadashi Okuma, Chiba (JP); Ryu Oi, Kanagawa (JP); Osamu Kohgo, Kanagawa (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/806,340

(22) PCT Filed: Jul. 26, 2000

(86) PCT No.: PCT/JP00/04973

§ 371 (c)(1),
(2), (4) Date: Mar. 29, 2001

(87) PCT Pub. No.: WO01/09256

PCT Pub. Date: Feb. 8, 2001

(30) Foreign Application Priority Data

Jul. 29, 1999 (JP) .................................. 11/215070
Aug. 6, 1999 (JP) .................................. 11/223982
Aug. 23, 1999 (JP) .................................. 11/235288
Sep. 9, 1999 (JP) .................................. 11/255772

(51) Int. Cl.
*C09D 11/10* (2006.01)
*C09B 29/42* (2006.01)
*C08K 5/3432* (2006.01)

(52) U.S. Cl. ..................... 523/160; 534/649; 534/772; 524/99

(58) Field of Classification Search ............... 523/160, 523/161; 106/31.27, 31.45, 31.47; 524/86, 524/87, 91, 99; 534/649, 843, 851, 856, 534/772
See application file for complete search history.

(56) References Cited

U.S. PATENT DOCUMENTS

| | | | |
|---|---|---|---|
| 4,514,226 A * | 4/1985 | Leoffler | 106/31.48 |
| 4,820,685 A * | 4/1989 | Murata | 503/227 |
| 5,359,075 A * | 10/1994 | Ohyama et al. | 546/154 |
| 5,413,630 A * | 5/1995 | Schwarz et al. | 106/31.48 |
| 5,965,634 A | 10/1999 | Idogawa et al. | |
| 6,031,019 A * | 2/2000 | Tsutsumi et al. | 523/160 |
| 6,379,443 B1 * | 4/2002 | Komatsu et al. | 106/31.58 |

FOREIGN PATENT DOCUMENTS

| | | |
|---|---|---|
| DE | 2210168 | 9/1973 |
| EP | 0061667 | 10/1982 |
| EP | 527049 | 2/1993 |
| EP | 0749120 | 12/1996 |
| EP | 0802065 | 10/1997 |
| JP | 57-167353 A | 10/1982 |
| JP | 64-087665 A | 3/1989 |
| JP | 06009891 A * | 1/1994 |
| JP | 6-59510 | 3/1994 |
| JP | A-6-145540 | 5/1994 |
| JP | 06-184481 A | 7/1994 |
| JP | 06184481 A * | 7/1994 |
| JP | A-7-156564 | 6/1995 |
| JP | 8-34933 | 2/1996 |
| JP | 08-183920 A | 7/1996 |
| JP | 08-239610 A | 9/1996 |
| JP | 10-176130 A | 6/1998 |
| JP | 10181225 | 7/1998 |
| JP | 11-124526 | 5/1999 |
| JP | 11-131000 | 5/1999 |

OTHER PUBLICATIONS

Machine Translation of JP08034933 (1996).*
Machine Translation (partial) of JP 11131000 (1999).*

(Continued)

*Primary Examiner*—Callie Shosho
(74) *Attorney, Agent, or Firm*—Buchanan Ingersoll PC

(57) ABSTRACT

Aqueous ink for ink-jet recording which contains at least a water-insoluble coloring matter, water and a resin as main components and which takes the form of an emulsion, in which the coloring matter is at least one yellow hue coloring matter selected from the group consisting of a quinophthalone compound represented by the formula (1);

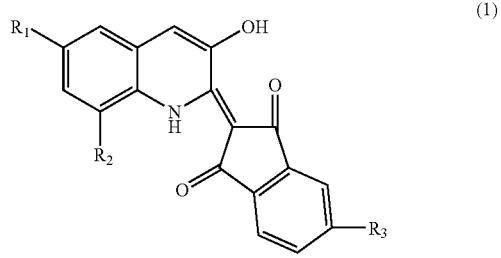

and a pyridone azo compound represented by the formula (2);

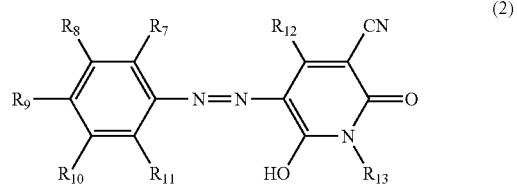

The ink is ink for ink-jet recording having excellent light resistance and storage stability, and enables formation of a high quality image without blotting, and obtained recording image is excellent in water resistance as ink for ink-jet recording.

2 Claims, No Drawings

OTHER PUBLICATIONS

English Translation of JP 11131000 (1999).*
English-language translation of JP 06-145540 published May 24, 1994.
English-language translation of JP 07-156564 published Jun. 20, 1995.
Office Action received for Japanese Patent Appln. No. 2000-223256 dated May 20, 2005.
Japanese Office Action dated Aug. 26, 2005.

* cited by examiner

YELLOW HUE COMPOUND AND AQUEOUS INK FOR INK-JET RECORDING SYSTEM USING THE SAME

TECHNICAL FIELD

The present invention relates to ink for ink-jet recording which is suited for ink-jet recording system. More specifically, it relates to a compound suited for yellow hue coloring matter for aqueous ink for ink-jet recording, and ink for ink-jet recording using the same.

BACKGROUND ART

Aqueous ink has been ordinarily used as ink for recording in ink-jet recording system. Aqueous ink basically comprises a coloring matter, water and an organic solvent, and it contains water as a main solvent in consideration of an odor and a safety to human bodies and surroundings.

Further, as a coloring matter, water-soluble dyes such as acid dyes, basic dyes, reactive dyes and direct dyes are generally used.

With respect to ink for ink-jet recording and a coloring matter, the following various characteristics are required.

That is:

(1) Properties of ink, such as a viscosity, a surface tension, a specific conductivity, a density and pH are appropriate.

(2) A long-term storage stability of ink is good.

(3) A dissolution stability of a dissolution component is so high that clogging of a nozzle does not occur.

(4) A quick-drying property in a recording material is good.

(5) A recorded image is vivid, and light resistance and water resistance are good.

However, a coloring matter and ink that satisfy all these characteristics have not yet been provided.

Especially, in ordinary aqueous ink, water-soluble dyes are used. Accordingly, when water is spilled on a recorded image, a dye is eluted, and a recorded image is blotted therewith or disappeared. Thus, it is much problematic in a water resistance.

At present, various studies have been made upon focussing on the improvement of the water resistance.

For example, a method in which an organic solvent or a resin is added to ink using a pigment or an oil-soluble dye as a coloring matter or aqueous ink using a water-soluble dye has been studied. However, in case of using a pigment, there were problems that a dispersion stability was bad and a storage stability was poor, inducing clogging of a nozzle. In case of using an oil-soluble dye, an organic solvent was used, posing a problem of an environmental sanitation such as an odor, and ink blotting notably occurred, decreasing qualities of an image. Moreover, even in case of using ink containing additives, there were problems that a storage stability was poor, clogging of a nozzle occurred, and ink was not jetted well because a viscosity of ink was increased.

Recently, Japanese Patent Laid-Open No. 340835/1994 describes ink using an aqueous dispersion containing a polyester resin colored with a dye or a pigment as a disperse phase. However, a pigment still suffers from these problems. Since a dye is also poor in a compatibility with a resin, it also involves such problems that a precipitate appears in ink, a storage stability is poor and clogging of a nozzle occurs.

As stated above, the characteristics of ink used in the ink-jet recording system in particular are greatly influenced by the characteristics intrinsic to the coloring matter. Thus, the discovery of a coloring matter that satisfies these conditions is quite important.

An object of the present invention is to provide a coloring matter which is excellent in solubility into an organic solvent, water resistance, light resistance and compatibility with a resin in particular.

Another object of the present invention is to provide aqueous yellow hue ink for ink-jet recording using the same, which is excellent in water resistance, light resistance and storage stability, and which is most suited for ink-jet recording system.

DISCLOSURE OF INVENTION

The present inventors have carried out an extensive investigation to achieve the above objects, and have found that a compound represented by the formula (1) and a compound represented by the formula (2) are a coloring matter met the above objects and thus have accomplished the present invention.

That is, the present invention is as follows.

(1) Aqueous ink for ink-jet recording which contains at least a water-insoluble coloring matter, water and a resin as main components and takes the form of an emulsion, the coloring matter being at least one yellow hue coloring matter selected from the group consisting of a quinophthalone compound represented by the formula (1);

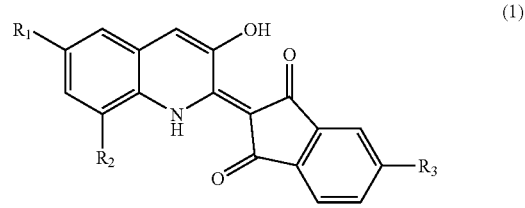

wherein each of $R_1$ to $R_3$ independently, represents a hydrogen atom, an unsubstituted or substituted alkyl group, —$CONR_4R_5$, or —$COOR_6$ (in which each of $R_4$ to $R_6$ independently, represents a hydrogen atom, an unsubstituted or substituted alkyl group, or an unsubstituted or substituted aryl group), and all of $R_1$ to $R_3$ are not a hydrogen atom at the same time, and a pyridone azo compound represented by the formula (2);

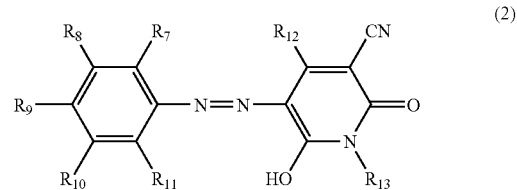

wherein each of $R_7$ to $R_{11}$ independently, represents a hydrogen atom, a halogen atom, an unsubstituted or substituted alkyl group, an aralkyl group, an unsubstituted or substituted alkoxy group, an unsubstituted or substituted aryl group, an unsubstituted or substituted aryloxy group, a hydroxyl group, —NR$_{14}$R$_{15}$ (in which R$_{14}$ and R$_{15}$ independently, represents a hydrogen atom, an unsubstituted or substituted alkyl group, an aralkyl group), —COX$_1$ [in which X$_1$ represents an unsubstituted or substituted alkoxy group, an unsubstituted or substituted aryloxy group, or —NR$_{16}$R$_{17}$ (in which each of R$_{16}$ and R$_{17}$ independently, represents a hydrogen atom, an unsubstituted or substituted alkyl group, an aralkyl group, or an unsubstituted or substituted aryl group)], —COO(CH$_2$)$_n$—COX$_2$, —OCOX$_3$, or —NHCOX$_4$ (in which each of X$_2$ to X$_4$ independently, represents an unsubstituted or substituted alkyl group, an aralkyl group, an unsubstituted or substituted aryl group, an unsubstituted or substituted alkoxy group, or an unsubstituted or substituted aryloxy group, and n is an integer of 1 to 3), R$_{12}$ represents an unsubstituted or substituted alkyl group, R$_{13}$ represents an unsubstituted or substituted alkyl group, an aralkyl group, or an unsubstituted or substituted aryl group.

(2) The aqueous ink for ink-jet recording according to the above 1 wherein the yellow hue coloring matter is a quinophthalone compound represented by the formula (1);

wherein each of R$_1$ to R$_3$ independently, represents a hydrogen atom, an unsubstituted or substituted alkyl group, —CONR$_4$R$_{15}$, or —COOR$_6$ (in which each of R$_4$ to R$_6$ independently, represents a hydrogen atom, an unsubstituted or substituted alkyl group, or an unsubstituted or substituted aryl group), and all of R$_1$ to R$_3$ are not a hydrogen atom at the same time.

(3) The aqueous ink for ink-jet recording according to the above 2 wherein R$_2$ and R$_3$ in the formula (1) are —CONR$_4$R$_5$ or —COOR$_6$ (in which each of R$_4$ to R$_6$ independently, represents a hydrogen atom, an unsubstituted or substituted alkyl group, or an unsubstituted or substituted aryl group).

(4) The aqueous ink for inkjet recording according to the above 2 wherein R$_1$ in the formula (1) is a hydrogen atom, or an unsubstituted or substituted alkyl group having 5 or less carbon atoms, and one of R$_2$ or R$_3$ is a hydrogen atom and the other is —CONR$_4$R$_5$ or —COOR$_6$ (in which each of R$_4$ to R$_6$ independently, represents a hydrogen atom, an unsubstituted or substituted alkyl group, or an unsubstituted or substituted aryl group).

(5) The aqueous ink for ink-jet recording according to the above 2 wherein R$_1$ in the formula (1) is a hydrogen atom, or an unsubstituted or substituted alkyl group having 5 or less carbon atoms, R$_2$ is a hydrogen atom, and R$_3$ is —CONR$_4$R$_5$ (in which each of R$_4$ and R$_5$ independently, represents an unsubstituted or substituted alkyl group having 6 or more carbon atoms, or an unsubstituted or substituted aryl group).

(6) The aqueous ink for ink-jet recording according to the above 1 wherein the yellow hue coloring matter is a pyridone azo compound represented by the formula (2);

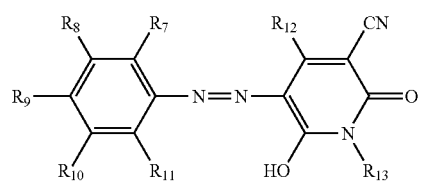

wherein each of R$_7$ to R$_{11}$ independently, represents a hydrogen atom, a halogen atom, an unsubstituted or substituted alkyl group, an aralkyl group, an unsubstituted or substituted alkoxy group, an unsubstituted or substituted aryl group, an unsubstituted or substituted aryloxy group, a hydroxyl group, —NR$_{14}$R$_{15}$ (in which each of R$_{14}$ and R$_{15}$ independently, represents a hydrogen atom, an unsubstituted or substituted alkyl group, or an aralkyl group), —COX$_1$ [in which X$_1$ represents an unsubstituted or substituted alkoxy group, an unsubstituted or substituted aryloxy group, or —NR$_{16}$R$_{17}$ (in which each of R$_{16}$ and R$_{17}$ independently, represents a hydrogen atom, an unsubstituted or substituted alkyl group, an aralkyl group, or an unsubstituted or substituted aryl group)], —COO(CH$_2$)$_n$—COX$_2$, —OCOX$_3$, or —NHCOX$_4$ (in which X$_2$ to X$_4$ represents an unsubstituted or substituted alkyl group, an aralkyl group, an unsubstituted or substituted aryl group, an unsubstituted or substituted alkoxy group, or an unsubstituted or substituted aryloxy group, and n is an integer of 1 to 3), R$_{12}$ represents an unsubstituted or substituted alkyl group, R$_{13}$ represents an unsubstituted or substituted alkyl group, an aralkyl group, or an unsubstituted or substituted aryl group.

(7) The aqueous ink for ink-jet recording according to the above 6 wherein at least one of R$_7$ to R$_9$ in the formula (2) is —COX$_1$, and R$_{13}$ is an unsubstituted or substituted alkyl group.

(8) The aqueous ink for ink jet recording according to the above 7 wherein the unsubstituted or substituted alkyl group represented by R$_{13}$ in the formula (2) is a linear or branched alkyl group having 8 or more carbon atoms, or —(CH$_2$)$_n$COR$_{18}$ having 8 or more carbon atoms [in which R$_{18}$ represents an unsubstituted or substituted alkoxy group, an unsubstituted or substituted aryloxy group, or —NR$_{19}$R$_{20}$ (in which each of R$_{19}$ and R$_{20}$ independently, represents a hydrogen atom, an unsubstituted or substituted alkyl group, an aralkyl group, or an unsubstituted or substituted aryl group), and n is an integer of 1 or 2].

(9) A quinophthalone compound represented by the formula (1);

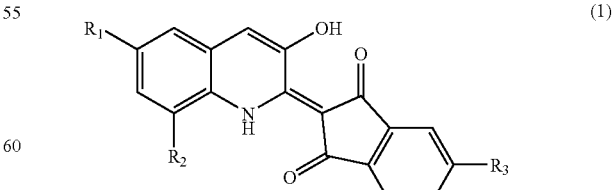

wherein

R$_1$ represents a linear, branched or cyclic alkyl group having 2 or more carbon atoms, $R_2$ represents a hydrogen atom, $R_3$ represents —$CONR_4R_5$ (in which each of $R_4$ and $R_5$ independently, represents a linear, branched or cyclic alkyl group having 6 or more carbon atoms).

(10) The quinophthalone compound according to the above 9 wherein in the formula (1), $R_1$ is isopropyl group, $R_2$ is a hydrogen atom, $R_3$ is —$CONR_4R_5$ (in which each of $R_4$ and $R_5$ independently, represents a linear or branched alkyl group having 8 or more carbon atoms).

(11) A pyridone azo compound represented by the formula (2);

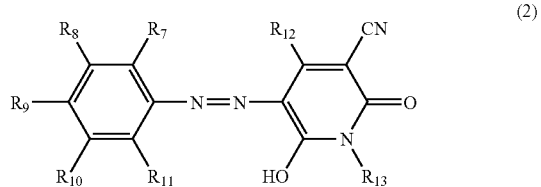

wherein
each of $R_7$ to $R_{11}$ independently, represents a hydrogen atom, a halogen atom, an unsubstituted or substituted alkyl group, an aralkyl group, an unsubstituted or substituted alkoxy group, an unsubstituted or substituted aryl group, an unsubstituted or substituted aryloxy group, a hydroxyl group, —$NR_{14}R_{15}$ (in which each of $R_{14}$ and $R_{15}$ independently, represents a hydrogen atom, an unsubstituted or substituted alkyl group, or an aralkyl group), —$COX_1$ [in which $X_1$ represents an unsubstituted or substituted alkoxy group, an unsubstituted or substituted aryloxy group, or —$NR_{16}R_{17}$ (in which $R_{16}$ and $R_{17}$ independently, represents a hydrogen atom, an unsubstituted or substituted alkyl group, an aralkyl group, or an unsubstituted or substituted aryl group)], —$COO(CH_2)_n$—$COX_2$, —$OCOX_3$, or —$NH$-$COX_4$ (in which $X_2$ to $X_4$ represents an unsubstituted or substituted alkyl group, an aralkyl group, an unsubstituted or substituted aryl group, an unsubstituted or substituted alkoxy group, or an unsubstituted or substituted aryloxy group, and n is an integer of 1 to 3), $R_{12}$ represents an unsubstituted or substituted alkyl group, $R_{13}$ represents an unsubstituted or substituted alkyl group, an aralkyl group, or an unsubstituted or substituted aryl group.

(12) The pyridone azo compound according to the above 11 wherein in the formula (2), at least one of $R_7$ to $R_{11}$ is —$COX_1$, and $R_{13}$ is an unsubstituted or substituted alkyl group.

(13) The pyridone azo compound according to the above 12 wherein in the formula (2), at least one of $R_7$ to $R_{11}$ is —$CONR_{16}R_{17}$.

(14) A resin fine particle colored by at least one yellow hue coloring matter selected from the group consisting of;

a quinophthalone compound represented by the formula (1);

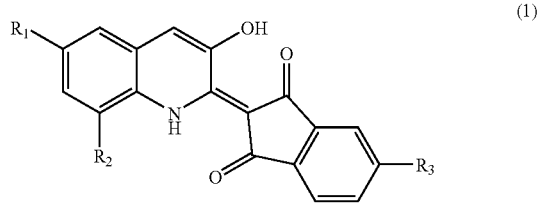

wherein
each of $R_1$ to $R_3$ independently, represents a hydrogen atom, an unsubstituted or substituted alkyl group, —$CONR_4R_5$, or —$COOR_6$ (in which each of $R_4$ to $R_6$ independently, represents a hydrogen atom, an unsubstituted or substituted alkyl group, or an unsubstituted or substituted aryl group), and all of $R_1$ to $R_3$ are not a hydrogen atom at the same time, and a pyridone azo compound represented by the formula (2);

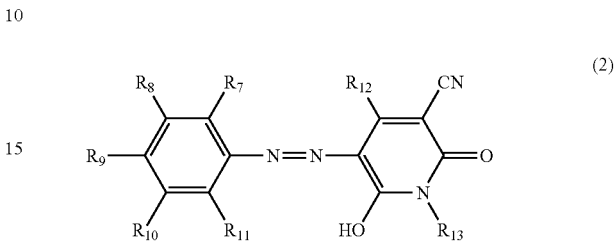

wherein
each of $R_7$ to $R_{11}$ independently, represents a hydrogen atom, a halogen atom, an unsubstituted or substituted alkyl group, an aralkyl group, an unsubstituted or substituted alkoxy group, an unsubstituted or substituted aryl group, an unsubstituted or substituted aryloxy group, a hydroxyl group, —$NR_{14}R_{15}$ (in which each of $R_{14}$ and $R_{15}$ independently, represents a hydrogen atom, an unsubstituted or substituted alkyl group, or an aralkyl group), —$COX_1$ [in which $X_1$ represents an unsubstituted or substituted alkoxy group, an unsubstituted or substituted aryloxy group, or —$NR_{16}R_{17}$ (in which each of $R_{16}$ and $R_{17}$ independently, represents a hydrogen atom, an unsubstituted or substituted alkyl group, an aralkyl group, an unsubstituted or substituted aryl group)], —$COO(CH_2)_n$—$COX_2$, —$OCOX_3$, or —$NH$-$COX_4$ (in which $X_2$ to $X_4$ represents an unsubstituted or substituted alkyl group, an aralkyl group, an unsubstituted or substituted aryl group, an unsubstituted or substituted alkoxy group, or an unsubstituted or substituted aryloxy group, and n is an integer of 1 to 3), $R_{12}$ represents an unsubstituted or substituted alkyl group, $R_{13}$ represents an unsubstituted or substituted alkyl group, an aralkyl group, or an unsubstituted or substituted aryl group.

(15) A dispersion obtained by dispersing in a water medium the resin fine particles of the above 14.

The yellow hue coloring matter of the present invention is excellent in water-resistance in particular and also excellent in light resistance and compatibility with a resin. Thus, it is suited for the aqueous ink for ink-jet recording. Further, the aqueous ink for ink-jet recording of the present invention, which is produced using the coloring matter is excellent in light resistance and storage stability. Especially, when it is used as aqueous ink for ink-jet recording system, the ink composition comprising containing at least the water insoluble yellow hue coloring matter of the present invention, water and a resin as main components and forming an emulsion can enable to form a high-quality image without blotting. And the recorded image has excellent water resistance.

Consequently, the present invention can provide the aqueous ink providing high-quality image, the yellow hue coloring matter having excellent light-resistance and storage stability applicable to ink for ink-jet recording, resin fine particles used the coloring matter, and the dispersion dispersed the particles in water.

BEST MODE FOR CARRYING OUT THE INVENTION

The present invention relates to aqueous ink for ink-jet recording forming emulsion comprising containing as main components at least a water-insoluble coloring matter, water and a resin, in which 1) a coloring matter which is insoluble is at least one yellow hue compound selected from the group consisting of the compound represented by the formula (1) and the compound represented by the formula (2), 2) resin fine particles colored with at least one yellow hue coloring matter selected from the group consisting of the compound represented by the formula (1) and the compound represented by the formula (2), 3) dispersions dispersed the resin fine particles in aqueous medium, and further, 4) aqueous ink for ink-jet recording which is an emulsion emulsified and dispersed the resin fine particles.

The coloring matter of the present invention, namely, the coloring matter preferably used in aqueous ink for ink-jet recording of the present invention is at least one yellow hue coloring matter [hereinafter also referred to as "a coloring matter" or "a coloring matter for ink jet recording"] selected from the group consisting of a quinophthalone compound represented by the formula (1) and a pyridone azo compound represented by the formula (2).

In the quinophthalone compound represented by the formula (1), each of $R_1$ to $R_3$ independently, represents a hydrogen atom, an unsubstituted or substituted alkyl group, —$CONR_4R_5$ or —$COOR_6$ (in which each of $R_4$ to $R_6$ independently, represents a hydrogen atom, an unsubstituted or substituted alkyl group, or an unsubstituted or substituted aryl group), provided all of $R_1$ to $R_3$ are not hydrogen atoms at the same time.

In the formula (1), an unsubstituted or substituted alkyl group is not limited in particular, and includes;

linear, branched or cyclic alkyl groups such as methyl group, ethyl group, n-propyl group, isopropyl group, n-butyl group, isobutyl group, tert-butyl group, sec-butyl group, n-pentyl group, isopentyl group, tert-pentyl group, sec-pentyl group, cyclopentyl group, n-hexyl group, 1-methylpentyl group, 2-methylpentyl group, 3-methylpentyl group, 4-methylpentyl group, 1,1-dimethylbutyl group, 1,2-dimethylbutyl group, 1,3-dimethylbutyl group, 2,3-dimethylbutyl group, 1,1,2-trimethylpropyl group, 1,2,2-trimethylpropyl group, 1-ethylbutyl group, 2-ethylbutyl group, 1-ethyl-2-methylpropyl group, cyclohexyl group, methylcyclopentyl group, n-heptyl group, 1-methylhexyl group, 2-methylhexyl group, 3-methylhexyl group, 4-methylhexyl group, 5-methylhexyl group, 1,1-dimethylpentyl group, 1,2-dimethylpentyl group, 1,3-dimethylpentyl group, 1,4-dimethylpentyl group, 2,2-dimethylpentyl group, 2,3-dimethylpentyl group, 2,4-dimethylpentyl group, 3,3-dimethylpentyl group, 3,4-dimethylpentyl group, 1-ethylpentyl group, 2-ethylpentyl group, 3-ethylpentyl group, 1,1,2-trimethylbutyl group, 1,1,3-trimethylbutyl group, 1,2,3-trimethylbutyl group, 1,2,2-trimethylbutyl group, 1,3,3-trimethylbutyl group, 2,3,3-trimethylbutyl group, 1-ethyl-1-methylbutyl group, 1-ethyl-2-methylbutyl group, 1-ethyl-3-methylbutyl group, 2-ethyl-1-methylbutyl group, 2-ethyl-3-methylbutyl group, 1-n-propylbutyl group, 1-iso-propylbutyl group, 1-iso-propyl-2-methylpropyl group, methylcyclohexyl group, n-octyl group, 1-methylheptyl group, 2-methylheptyl group, 3-methylheptyl group, 4-methylheptyl group, 5-methylheptyl group, 6-methylheptyl group, 1,1-dimethylhexyl group, 1,2-dimethylhexyl group, 1,3-dimethylhexyl group, 1,4-dimethylhexyl group, 1,5-dimethylhexyl group, 2,2-dimethylhexyl group, 2,3-dimethylhexyl group, 2,4-dimethylhexyl group, 2,5-dimethylhexyl group, 3,3-dimethylhexyl group, 3,4-dimethylhexyl group, 3,5-dimethylhexyl group, 4,4-dimethylhexyl group, 4,5-dimethylhexyl group, 1-ethylhexyl group, 2-ethyl hexyl group, 3-ethylhexyl group, 4-ethylhexyl group, 1-n-propylpentyl group, 2-n-propylpentyl group, 1-iso-propylpentyl group, 2-iso-propylpentyl group, 1-ethyl-1-methylpentyl group, 1-ethyl-2-methylpentyl group, 1-ethyl-3-methylpentyl group, 1-ethyl-4-methylpentyl group, 2-ethyl-1-methylpentyl group, 2-ethyl-2-methylpentyl group, 2-ethyl-3-methylpentyl group, 2-ethyl-4-methylpentyl group, 3-ethyl-1-methylpentyl group, 3-ethyl-2-methylpentyl group, 3-ethyl-3-methylpentyl group, 3-ethyl-4-methylpentyl group, 1,1,2-trimethylpentyl group, 1,1,3-trimethylpentyl group, 1,1,4-trimethylpentyl group, 1,2,2-trimethylpentyl group, 1,2,3-trimethylpentyl group, 1,2,4-trimethylpentyl group, 1,3,4-trimethylpentyl group, 2,2,4-trimethylpentyl group, 2,2,4-trimethylpentyl group, 2,3,4-trimethylpentyl group, 1,3,3-trimethylpentyl group, 2,3,3-trimethylpentyl group, 3,3,4-trimethylpentyl group, 1,4,4-trimethylpentyl group, 2,4,4-trimethylpentyl group, 3,4,4-trimethylpentyl group, 1-n-butylbutyl group, 1-iso-butylbutyl group, 1-sec-butylbutyl group, 1-tert-butylbutyl group, 2-tert-butylbutyl group, 1-n-propyl-1-methylbutyl group, 1-n-propyl-2-methylbutyl group, 1-n-propyl-3-methylbutyl group, 1-iso-propyl-1-methylbutyl group, 1-iso-propyl-2-methylbutyl group, 1-iso-propyl-3-methylbutyl group, 1,1-diethylbutyl group, 1,2-diethylbutyl group, 1-ethyl-1,2-dimethylbutyl group, 1-ethyl-1,3-dimethylbutyl group, 1-ethyl-2,3-dimethylbutyl group, 2-ethyl-1,1-dimethylbutyl group, 2-ethyl-1,2-dimethylbutyl group, 2-ethyl-1,3-dimethylbutyl group, 2-ethyl-2,3-dimethylbutyl group, 1,2-dimethylcyclohexyl group, 1,3-dimethylcyclohexyl group, 1,4-dimethylcyclohexyl group, ethylcyclohexyl group, n-nonyl group, 3,5,5-trimethylhexyl group and n-decyl group;

linear, branched or cyclic haloalkyl groups substituted by one or more halogen atoms, such as fluoromethyl group, trifluoromethyl group, chloromethyl group, dichloromethyl group, trichloromethyl group, bromomethyl group, dibromomethyl group, tribromomethyl group, fluoroethyl group, chloroethyl group, bromoethyl group, trifluoroethyl group, pentafluoroethyl group, tetrachloroethyl group and hexafluoroisopropyl group;

linear, branched or cyclic alkoxy alkyl groups such as methoxymethyl group, ethoxymethyl group, propoxymethyl group, butoxymethyl group, pentoxymethyl group, hexyloxymethyl group, cyclohexyloxymethyl group, methoxyethyl group, ethoxyethyl group, propoxyethyl group, butoxyethyl group, pentoxyethyl group, hexyloxyethyl group, cyclohexyloxyethyl group, methoxyethyl group, methoxyethoxyethyl group, methoxypropyl group, ethoxypropyl group, propoxypropyl group, butoxypropyl group, pentoxypropyl group, hexyloxypropyl group, cyclohexylpropyl group and methoxyethoxypropyl group;

linear, branched or cycloalkylthioalkyl groups such as methylthiomethyl group, ethylthiomethyl group, propylthiomethyl group, butylthiomethyl group, pentylthiomethyl group, hexylthiomethyl group, cyclohexylthiomethyl group, methylthioethyl group, ethylthioethyl group, propylthioethyl group, butylthioethyl group, pentylthioethyl group, hexylthioethyl group, cyclohexylthioethyl group, methoxyethylthioethyl group, methylthiopropyl group, ethylthiopropyl group, propylthiopropyl group, butylthiopropyl group, pentylthiopropyl group, hexylthiopropyl group, cyclohexylthiopropyl group and methoxyethylthiopropyl group;

alkylaminoalkyl groups or dialkylaminoalkyl groups such as N-methylaminomethyl group, N,N-dimethylaminomethyl group, N-ethlaminomethyl group, N,N-diethylaminomethyl group, N-propylaminomethyl group, N,N-dipropylaminomethyl group, N-methyl-N-ethylaminomethyl group, N-methylaminoethyl group, N,N-dimethylaminoethyl group, N-ethylaminoethyl group, N,N-diethylaminoethyl group, N-propylaminoethyl group, N,N-dipropylaminoethyl group, N-methyl-N-ethylaminoethyl group, N-methylaminopropyl group, N,N-dimethyaminopropyl group, N-ethylaminopropyl group, N,N-diethylaminopropyl group, N-propylaminopropyl group, N,N-dipropylaminopropyl group and N-ethyl-N-butylaminopropyl group;

hydroxyalkyl groups such as hydroxyethyl group;

alkylcarbonyloxyalkyl groups such as methylcarbonyloxyethyl group;

alkoxycarbonylalkyl groups such as methoxycarbonylmethyl group, ethoxycarbonylmethyl group, propoxycarbonylmethyl group, butoxycarbonylmethyl group, pentyloxycarbonylmethyl group and hexyloxycarbonylmehtyl group;

aryl oxycarbonylalkyl groups such as phenoxycarbonylmethyl group;

aralkyl groups such as benzyl group and phenetyl group.

In the formula (1), an unsubstituted or substituted aryl group is not limited in particular, and includes;

aryl groups substituted by a linear, branched or cyclic alkyl group such as phenyl group, naphtyl group, anthranyl group, 2-methylphenyl group, 3-methylphenyl group, 4-methylphenyl group, 2,3-dimethylphenyl group, 2,4-dimethylphenyl group, 2,5-dimethyphenyl group, 2,6-dimethylphenyl group, 3,4-dimethylphenyl group, 3,5-dimethylphenyl group, 3,6-dimethylphenyl group, 2,3,4-trimethylphenyl group, 2,3,5-trimethylphenyl group, 2,3,6-trimethylphenyl group, 2,4,5-trimethylphenyl group, 2,4,6-trimethylphenyl group, 3,4,5-trimethyphenyl group, 2-ethylphenyl group, propylphenyl group, butylphenyl group, hexylphenyl group, cyclohexylphenyl group, octylphenyl group, 2-methyl-1-naphthyl group, 3-methyl-1-naphtyl group, 4-methyl-naphtyl group, 5-methyl-1-naphtyl group, 6-methyl-1-naphtyl group, 7-methyl-1-naphtyl group, 8-methyl-1-naphtyl group, 1-methyl-2-naphthyl group, 3-methyl-2-naphthyl group, 4-methyl-2-naphthyl group, 5-methyl-2-naphthyl group, 6-methyl-2-naphthyl group, 7-methyl-2-naphthyl group, 8-methyl-2-naphthyl group and 2-ethyl-1-naphtyl group;

aryl groups substituted a linear, branched or cyclic alkoxy group such as 3-methoxyphenyl group, 4-methoxyphenyl group, 2,3-dimethoxyphenyl group, 2,4-dimethoxyphenyl group, 2,5-dimethoxyphenyl group, 2,6-dimethoxyphenyl group, 3,4-dimethoxyphenyl group, 3,5-dimethoxyphenyl group, 3,6-dimethoxyphenyl group, 2,3,4-trimethoxyphenyl group, 2,3,5-trimethoxyphenyl group, 2,3,6-trimethoxyphenyl group, 2,4,5-trimethoxyphenyl group, 2,4,6-trimethoxyphenyl group, 3,4,5-trimethoxyphenyl group, 2-ethoxyphenyl group, propoxyphenyl group, butoxyphenyl group, hexyloxyphenyl group, cyclohexyloxyphenyl group, octyloxyphenyl group, 2-methoxy-1-naphtyl group, 3-methoxy-1-naphtyl group, 4-methoxy-1-naphtyl group, 5-methoxy-1-naphtyl group, 6-methoxy-1-naphtyl group, 7-methoxy-1-naphtyl group, 8-methoxy-1-naphtyl group, 1-methoxy-2-naphtyl group, 3-methoxy-2-naphtyl group, 4-methoxy-2-naphtyl group, 5-methoxy-2-naphtyl group, 6-methoxy-2-naphtyl group, 7-methoxy-2-naphtyl group, 8-methoxy-2-naphtyl group and 2-ethoxy 1-naphtyl group;

aryl groups substituted by halogen atom such as chlorophenyl group, dichlorophenyl group, trichlorophenyl group, bromophenyl group, dibromophenyl group, iodophenyl group, fluorophenyl group, difluorophenyl group, trifluorophenyl group, tetrafluorophenyl group and pentafluorophenyl, group;

N-monoamino substituted aryl groups or N,N-diamino substituted aryl groups such as N,N-dimethylaminophenyl group, N,N-diethylaminophenyl group, N-phenyl-N-methylaminophenyl group, N-triyl-N-ethylaminophenyl group, N-chlorophenyl-N-cyclohexylaminophenyl group and N,N-ditriylaminophenyl group; and alkylthioaryl group; and arylthioaryl groups such as methylthiophenyl group, ethylthiophenyl group, methylthionaphtyl group and phenylthiophenyl group.

In these groups, a hydrogen atom, n-propyl group, isopropyl group, n-butyl group, iso-butyl group, n-hexyl group, n-octyl group, 2-ethylhexyl group, methoxyethyl group, ethoxyethyl group, butoxyethyl group and methoxyethoxyethyl group are preferably as the substituent of $R_1$ to $R_3$ in particular.

Quinophthalone compounds used preferably in the aqueous ink for ink-jet recording of the present invention are the compounds which, in the formula (1), $R_1$ is a hydrogen atom or an unsubstituted or substituted alkyl group having 5 or less carbon atoms, and one of $R_2$ and $R_3$ is a hydrogen atom and the other is $-CONR_4R_5$ or $-COOR_6$ (in which each of $R_4$ to $R_6$ independently, represents a hydrogen atom, an unsubstituted or substituted alkyl group, or an unsubstituted or substituted aryl group), and more preferably $R_1$ is a hydrogen atom or an unsubstituted or substituted alkyl group having 5 or less carbon atoms, and $R_2$ is a hydrogen atom, $R_3$ is $-CONR_4R_5$ (in which each of $R_4$ and $R_6$ independently, represents an unsubstituted or substituted alkyl group having 6 or more carbon atoms, or an unsubstituted or substituted aryl group).

These compounds are especially useful as coloring matter for ink-jet recording ink.

Specific examples of a quinophthalone compound represented by the formula (1) are shown in Table 1. In the present invention, however, the coloring matters shown in Table 1 are not critical.

TABLE 1

| | | Formula (1) | |
|---|---|---|---|
| No. | $R_1$ | $R_2$ | $R_3$ |
| 1 | $-C_3H_7(i)$ | H | $-CON[CH_2CH(C_2H_5)C_4H_9]_2$ |
| 2 | $-C_3H_7(i)$ | H | $-CON(C_8H_{17})_2$ |
| 3 | $-C_3H_7(i)$ | H | $-COO(C_2H_4O)_4H$ |
| 4 | $-C_6H_{12}(cyclo)$ | H | $-COOC_8H_{17}$ |
| 5 | $-C_4H_9(n)$ | H | $-COOC_2H_4OC_2H_4OC_4H_9$ |
| 6 | $-C_4H_9(i)$ | H | $-CON(C_6H_{13})_2$ |
| 7 | $-C_8H_{17}(n)$ | H | $-COOCH_2CH(C_2H_5)C_4H_9$ |
| 8 | $-C_{12}H_{25}(n)$ | H | $-CONHC_{18}H_{37}$ |
| 9 | H | $-CON(C_8H_{17})_2$ | H |
| 10 | H | $-COOC_{12}H_{25}$ | H |
| 11 | $-C_3H_7(i)$ | $-CON[CH_2CH(C_2H_5)C_4H_9]_2$ | H |
| 12 | H | $-CON(C_4H_9)_2$ | $-CON(C_4H_9)_2$ |
| 13 | H | $-COOC_{18}H_{37}$ | $-COOC_{18}H_{37}$ |
| 14 | H | $-C_4H_9(n)$ | $-CON(C_4H_9)_2$ |
| 15 | H | $-C_4H_9(n)$ | $-COOC_2H_4OC_2H_4OC_4H_9$ |
| 16 | $-CH_3$ | $-COOCH_2CH(C_2H_5)C_4H_9$ | $-COOC_2H_4OC_2H_4OC_2H_5$ |
| 17 | H | $-CON[CH_2CH(C_2H_5)C_4H_9]_2$ | $-COOC_{18}H_{37}$ |
| 18 | H | $-CON(CH_3)CH_2CH(C_2H_5)C_4H_9$ | $-CON(CH_3)CH_2CH(C_2H_5)C_4H_9$ |
| 19 | H | $-CON(C_6H_{13})_2$ | $-CON(C_6H_{13})_2$ |

TABLE 1-continued

Formula (1)

| No. | $R_1$ | $R_2$ | $R_3$ |
|---|---|---|---|
| 20 | —$CH_3$ | —$COOC_{18}H_{37}$ | —$COOC_{18}H_{37}$ |
| 21 | —$CH_3$ | —$CON(C_6H_{13})_2$ | —$CON(C_6H_{13})_2$ |
| 22 | H | —$C_3H_7(i)$ | —$CON(CH_2CH_2OOCCH_3)_2$ |
| 23 | —$C_2H_5$ | —$COOC_{12}H_{25}$ | H |
| 24 | —$C_4H_9(n)$ | H | —$COOC_6H_4\text{-m-}N(C_2H_5)_2$ |
| 25 | —$C_4H_9(n)$ | H | —$COOC_6H_4\text{-m-}N(C_4H_9)_2$ |
| 26 | —$C_4H_9(n)$ | H | —$COOC_6H_4\text{-p-}N(C_2H_5)_2$ |
| 27 | H | H | —$CON[CH_2CH(C_2H_5)C_4H_9]_2$ |
| 28 | —$C_3H_7(i)$ | H | —$CON[C_8H_{17}(i)]_2$ |
| 29 | —$C_3H_7(i)$ | H | —$CON[C_{12}H_{25}(n)]_2$ |
| 30 | —$C_3H_7(i)$ | H | —$CON[C_{10}H_{21}(n)]_2$ |
| 31 | —$C_3H_7(i)$ | H | —$CON[C_6H_{13}(n)]_2$ |
| 32 | —$C_3H_7(i)$ | H | —$CON[CH_2CH(CH_3)C_5H_{11}]_2$ |
| 33 | —$C_3H_7(i)$ | H | —$CON[CH(CH_3)C_6H_{13}]_2$ |
| 34 | —$C_2H_5$ | H | $CON[CH_2CH(C_2H_5)C_4H_9]_2$ |
| 35 | —$C_6H_{13}(n)$ | H | —$CON[CH_2CH(C_2H_5)C_4H_9]_2$ |

On the other hand, in pyridone azo compound represented by the formula (2), each of $R_7$ to $R_{11}$ independently, represents, a hydrogen atom, a halogen atom, an unsubstituted or substituted alkyl group, an aralkyl group, an unsubstituted or substituted alkoxy group, an unsubstituted or substituted aryl group, an unsubstituted or substituted aryloxy group, a hydroxyl group, —$NR_{14}, R_{15}$ (in which each of $R_{14}$ and $R_{15}$ independently, represents a hydrogen atom, an unsubstituted or substituted alkyl group, or an unsubstituted or substituted aralkyl group), —$COX_1$ [in which $X_1$ represents an unsubstituted or substituted alkoxy group, an unsubstituted or substituted aryloxy group, or —$NR_{16}R_{17}$ (in which each of $R_{16}$ and $R_{17}$ independently, represents a hydrogen group, an unsubstituted or substituted alkyl group, an aralkyl group, or an unsubstituted or substituted aryl group)], —COO($CH_2$)$_n$—$COX_2$, —$OCOX_3$, or —$NHCOX_4$ (in which each of $X_2$ to $X_4$ independently, represents an unsubstituted or substituted alkyl group, an aralkyl group, an unsubstituted or substituted aryl group, an unsubstituted or substituted alkoxy group, or an unsubstituted or substituted aryloxy group, and n is an integer of 1 to 3), $R_{12}$ represents an unsubstituted or substituted alkyl group, $R_{13}$ represents an unsubstituted or substituted alkyl group, an aralkyl group or an unsubstituted or substituted aryl group.

In the formula (2), an unsubstituted or substituted alkyl group is not limited in particular and includes, for example, linear, branched or cyclic alkyl groups such as methyl group, ethyl group, n-propyl group, iso-propyl group, n-butyl group, iso-butyl group, tert-butyl group, n-pentyl group, iso-pentyl group, n-hexyl group, iso-hexyl group, 2-ethylhexyl group, 3,5,5-trimethylhexyl group, n-heptyl group, n-octyl group, tert-octyl group, n-nonyl group and iso-nonyl group;

cycloalkyl groups such as cyclopentyl group and cyclohexyl group;

halogeno-alkyl groups such as trifluoromethyl group and chloroethyl group;

cyanoalkyl group such as cyanoethyl group;

alkoxyalkyl group such as methoxymethyl group, ethoxymethyl group, methoxyethyl group, ethoxyethyl group, n-propoxyethyl group, iso-propoxyethyl group, n-butoxyethyl group, iso-butoxyethyl group and tert-butoxyethyl group.

In the formula (2), an aralkyl group is not limited in particular, and includes, for example, aralkyl groups such as benzyl group and phenetyl group.

In the formula (2), an unsubstituted or substituted alkoxy group is not limited in particular, and includes, for example, linear, branched or cyclic alkoxy groups such as methoxy group, ethoxy group, n-propoxy group, isopropoxy group, n-butoxy group, iso-butoxy group, tert-butoxy group, n-pentyloxy group, iso-pentyloxy group, n-hexyloxy group, iso-hexyloxy group, 2-ethylhexyloxy group, 3,5,5-trimethylhexyloxy group, n-heptyloxy group, n-octyloxy group and n-nonyloxy group;

cycloalkyl groups such as cyclopentyloxy group and cyclohexyloxy group;

alkoxyalkoxy groups such as methoxymethoxy group, ethoxymethoxy group, ethoxyethoxy group, n-propoxymethoxy group, iso-propoxymethoxy group, n-propoxyethoxy group, iso-propoxyethoxy group, n-butoxyethoxy group, iso-butoxyethoxy group, tert-butoxyethoxy group, n-pentyloxyethoxy group, iso-pentyloxyethoxy group, n-hexyloxyethocy group, iso-hexyloxyethoxy group, 2-ethylhexyloxyethoxy group, 3,5,5-trimethylhexyloxyethoxy group, n-heptyloxyethoxy group, n-octyloxyethoxy group and n-nonyloxyethoxy group;

aralkyloxy groups such as benzyloxy group.

Further, in the formula (2), an unsubstituted or substituted aryl group is not limited in particular and includes, for example, phenyl group, toluyl group, xylyl group, naphthyl group, chlorophenyl group, bromophenyl group, fluorophenyl group and trifluoromethylphenyl group.

Further more, in the formula (2), an unsubstituted or substituted aryloxy group is not limited in paticular and includes, for example, phenoxy group, methylphenoxy group, dimethylphenoxy group, methoxyphenoxy group, chlorophenoxy group, bromophenoxy group, fluorophenoxy group, trifluorophenoxy group and naphtyloxy group.

Especially, pyridone azo compounds used preferably in the aqueous ink for ink-jet recording of the present invention are the compounds in which in the formula (2), at least one of $R_7$ to $R_9$ is —$CONR_{16}R_{17}$ having 17 or more carbon atoms, and $R_{13}$ is a linear or branched alkyl group having 8 or more carbon atoms, or —$(CH_2)_nCOOR_{18}$ having 8 or more carbon atoms.

More preferably, $R_{12}$ is a linear or branched alkyl group having 4 or more carbon atoms, and $R_{13}$ is a lenear or branched alkyl group having 10 or more carbon atoms.

Further more preferably, $R_{13}$ is a linear or branched alkyl group having 14 or more carbon atoms.

Particular examples of pyridone azo compounds represented by the formula (2) are shown in Table 2, however, the compounds used in the present invention are not limited by these compounds.

TABLE 2

| Coloring No. | Formula (2) | | | | | | |
|---|---|---|---|---|---|---|---|
| | $R_7$ | $R_8$ | $R_9$ | $R_{10}$ | $R_{11}$ | $R_{12}$ | $R_{13}$ |
| 36 | H | H | —$C_8H_{17}$(n) | H | H | —$CH_3$ | —$C_8H_{17}$(n) |
| 37 | H | H | —$C_4H_9$(n) | H | H | —$CH_3$ | —$C_8H_{19}$(i) |
| 38 | H | H | —$C_4H_9$(i) | H | H | —$CH_3$ | —$C_8H_{17}$(n) |
| 39 | H | H | —$C_4H_9$(t) | H | H | —$CH_3$ | -ph |
| 40 | H | H | —$C_6H_{13}$(n) | H | H | —$CH_3$ | —$CH_3$-ph |
| 41 | H | H | cyclohexyl | H | H | —$CH_3$ | cyclohexyl |
| 42 | H | H | —$OC_8H_{17}$(n) | H | H | —$CH_3$ | —$C_8H_{17}$(n) |
| 43 | H | H | —$OC_2H_5$ | H | H | —$CH_3$ | —$C_{10}H_{21}$(n) |
| 44 | H | H | cyclohexyloxy | H | H | —$CH_3$ | —$C_{10}H_{21}$(n) |
| 45 | H | H | —COO$C_2H_4$COO$C_4H_9$(n) | H | H | —$CH8$ | —$CH_2CH(C_2H_5)C_4H_9$(n) |
| 46 | H | H | —COO$CH_2$COO$C_4H_9$(i) | H | H | —$CH_3$ | —$CH_2CH(C_2H_5)C_4H_9$(n) |
| 47 | H | H | —COO$CH_2$COO$C_5H_{11}$(i) | H | H | —$CH_3$ | —$CH_2CH(C_2H_5)C_4H_9$(n) |
| 48 | H | H | —COO$CH_2$COO$C_6H_{13}$(i) | H | H | —$CH_3$ | —$CH_2CH(C_2H_5)C_4H_9$(n) |
| 49 | H | H | —COO$CH_2$COO$C_8H_{17}$(i) | H | H | —$CH_3$ | —$CH_2CH(C_2H_5)C_4H_9$(n) |
| 50 | H | H | —COO$CH_2$COO$C_2H_5$ | H | H | —$CH_3$ | —$C_8H_{17}$(n) |
| 51 | H | H | —COO$C_4H_9$(n) | H | H | —$CH_3$ | —$C_8H_{17}$(n) |
| 52 | H | H | —COO$C_5H_{11}$(i) | H | H | —$CH_3$ | —$CH_2CH(C_2H_5)C_4H_9$(n) |
| 53 | H | H | —COO$C_6H_{13}$(i) | H | H | —$CH_3$ | —$CH_2CH(C_2H_5)C_4H_9$(n) |
| 54 | H | H | —COO$C_8H_{17}$(i) | H | H | —$CH_3$ | —$CH_2CH_2OCH(CH_3)_2$ |
| 55 | H | H | —COO$CH_2CH(C_2H_5)C_4H_9$(n) | H | H | —$CH_3$ | —$CH_2CH(C_2H_5)C_4H_9$(n) |
| 56 | H | H | —COO$CH_2$COO$CH_2$CH($C_2H_5$)$C_4H_9$(n) | H | H | —$CH_3$ | —$C_{10}H_{21}$(n) |
| 57 | H | H | —COO$CH_2CH_2CH(CH_3)CH_2C(CH_3)_3$ | H | H | —$CH_3$ | —$C_{10}H_{21}$(n) |
| 58 | H | H | —COO$CH_2$-ph | H | H | —$CH_3$ | —$C_{10}H_{21}$(n) |
| 59 | H | H | —OCO$CH_2CH(C_2H_5)C_4H_9$(n) | H | H | —$CH_3$ | —$C_{10}H_{21}$(n) |
| 60 | H | H | —OCO$CH_2CH_2CH(CH_3)CH_2C(CH_3)_3$ | H | H | —$CH_3$ | —$C_{10}H_{21}$(n) |
| 61 | H | H | —OCO$C_4H_9$(i) | H | H | —$CH_3$ | —$C_{10}H_{21}$(n) |
| 62 | H | H | —OCO$C_8H_{17}$(n) | H | H | —$CH_3$ | —$C_{10}H_{21}$(n) |
| 63 | H | H | —CONHC$H_2$CH($C_2H_5$)$C_4H_9$(n) | H | H | —$CH_3$ | —$C_{12}H_{25}$(n) |
| 64 | H | H | —CONH$C_8H_{17}$(n) | H | H | —$CH_3$ | —$C_{12}H_{25}$(n) |
| 65 | H | H | —CONHC$H_2CH_2CH(CH_3)CH_2C(CH_3)_3$ | H | H | —$CH_3$ | —$C_{12}H_{25}$(n) |
| 66 | H | H | —CON[$CH_2CH(C_2H_3)C_4H_9$(n)]$_2$ | H | H | —$CH_3$ | —$CH_2CH(C_2H_5)C_4H_9$(n) |
| 67 | H | H | —CON[$C_4H_9$(n)]$_2$ | H | H | —$CH_3$ | —$C_{12}H_{25}$(n) |
| 68 | H | H | —CON[$C_4H_9$(i)]$_2$ | H | H | —$CH_3$ | —$C_{12}H_{25}$(n) |
| 69 | H | H | —CON[$CH_2CH(C_2H_5)C_4H_9$(n)]$_2$ | H | H | —$CH_3$ | —$C_8H_{17}$(n) |
| 70 | H | H | —CON[$CH_2CH(C_2H_5)C_4H_9$(n)]$_2$ | H | H | —$CF_3$ | —$CH_2CH(C_2H_5)C_4H_9$(n) |
| 71 | H | H | —CON[$CH_2CH(C_2H_5)C_4H_9$(n)]$_2$ | H | H | —$C_2H_5$ | —$CH_2CH(C_2H_5)C_4H_9$(n) |
| 72 | H | H | —CON[$CH_2CH(C_2H_5)C_4H_9$(n)]$_2$ | H | H | —$CH_3$ | —$CH_3$-ph |
| 73 | H | H | —CON[$CH_2CH(C_2H_5)C_4H_9$(n)]$_2$ | H | H | —$CH_3$ | —$CH_2CH_2CH_2OCH(CH_3)_2$ |
| 74 | H | H | —CON[$CH_2CH(C_2H_5)C_4H_9$(n)]$_2$ | H | H | —$CH_3$ | —$C_8H_{17}$(n) |
| 75 | H | H | —CON[$C_8H_{17}$(n)]$_2$ | H | H | —$CH_3$ | —$C_9H_{19}$(i) |
| 76 | H | —$CF_3$ | H | H | H | —$CH_3$ | —$C_9H_{19}$(i) |

TABLE 2-continued

Formula (2)

| Coloring No. | R₇ | R₈ | R₉ | R₁₀ | R₁₁ | R₁₂ | R₁₃ |
|---|---|---|---|---|---|---|---|
| 77 | H | —CF₃ | H | H | H | —CH₃ | —C₉H₁₉(n) |
| 78 | H | —OC₄H₉(i) | F | H | H | —CH₃ | —C₈H₁₇(n) |
| 79 | H | —C₂H₅ | —C₂H₅ | H | H | —CH₃ | —C₁₀H₂₁(n) |
| 80 | —C₂H₅ | —OCH₃ | —OCH₃ | H | H | —CH₃ | —C₁₀H₂₁(n) |
| 81 | H | H | H | H | H | —CH₃ | —C₈H₁₇(n) |
| 82 | H | —OCOCH₂CH(C₂H₅)C₄H₉(n) | H | H | H | —CH₃ | —CH₂CH₂OCH(CH₃)₂ |
| 83 | H | —OCOC₂H₄CH(CH₃)CH₂C(CH₃)₃ | H | H | H | —CH₃ | —C₈H₁₇(n) |
| 84 | H | —CON[CH₂CH(C₂H₅)C₄H₉(n)]₂ | H | H | H | —CH₃ | —CH₂CH(C₂H₅)C₄H₉(n) |
| 85 | H | —CON[CH₂CH(C₂H₅)C₄H₉(n)]₂ | H | H | H | —CH₃ | —C₈H₁₇(n) |
| 86 | —C₄H₉(i) | H | H | H | H | —CH₃ | —C₈H₁₇(n) |
| 87 | —OC₄H₉(i) | H | H | H | H | —CH₃ | —C₈H₁₇(n) |
| 88 | —COOCH₂COOC₈H₁₇(n) | H | H | H | H | —CH₃ | —CH₂CH(C₂H₅)C₄H₉(n) |
| 89 | —COOC₅H₁₁(i) | H | H | H | H | —CH₃ | —CH₂CH(C₂H₅)C₄H₉(n) |
| 90 | —OCOCH₂CH(C₂H₅)C₄H₉(n) | H | H | H | H | —CH₃ | —CH₂CH(C₂H₅)C₄H₉(n) |
| 91 | —OCOC₂H₄CH(CH₃)CH₂C(CH₃)₃ | H | H | H | H | —CH₃ | —CH₂CH(C₂H₅)C₄H₉(n) |
| 92 | —CONHCH₂CH(C₂H₅)C₄H₉(n) | H | H | H | H | —CH₃ | —C₈H₁₇(n) |
| 93 | —CON[CH₂CH(C₂H₅)C₄H₉(n)]₂ | H | H | H | H | —CH₃ | —CH₂CH(C₂H₅)C₄H₉(n) |
| 94 | —CON[CH₂CH(C₂H₅)C₄H₉(n)]₂ | H | H | H | H | —CH₃ | —CH₂CH(C₂H₅)C₄H₉(n) |
| 95 | —CON[CH₂CH(C₂H₅)C₄H₉(n)]₂ | H | H | H | H | —CH₃ | —CH₂CH(C₂H₅)C₄H₉(n) |
| 96 | —C₃H₇(i) | H | H | H | —C₃H₇(i) | —CH₃ | —CH₂CH(C₂H₅)C₄H₉(n) |
| 97 | —CH₃ | H | H | —C₄H₉(t) | —C₃H₇(i) | —CH₃ | —CH₂CH(C₂H₅)C₄H₉(n) |
| 98 | —C₄H₉(t) | H | H | H | H | —CH₃ | —C₈H₁₇(n) |
| 99 | —C₃H₇(i) | H | H | H | H | —CH₃ | —C₈H₁₇(n) |
| 100 | H | —C₃H₇(i) | H | H | H | —CH₃ | —C₈H₁₇(n) |
| 101 | H | cyclohexyl | H | H | H | —CH₃ | —C₈H₁₇(n) |
| 102 | H | —OC₈H₁₇(n) | H | H | H | —CH₃ | —CH₂CH(C₂H₅)C₄H₉(n) |
| 103 | H | —OCOCH₂COOC₄H₉(i) | H | H | H | —CH₃ | —CH₂CH(C₂H₅)C₄H₉(n) |
| 104 | H | —COOC₄H₉(i) | H | H | H | —CH₃ | —CH₂CH(C₂H₅)C₄H₉(n) |
| 105 | H | —COOCH₂COOCH₂CH(C₂H₅)C₄H₉(n) | H | H | H | —CH₃ | —CH₂CH(C₂H₅)C₄H₉(n) |
| 106 | H | —OCOC₈H₁₇(n) | H | H | H | —CH₃ | —C₁₀H₂₁(n) |
| 107 | H | —CONHCH₂CH(C₂H₅)C₄H₉(n) | H | H | H | —CH₃ | —C₁₂H₂₅(n) |
| 108 | H | —CONHC₈H₁₇(n) | H | H | H | —CH₃ | —C₁₂H₂₅(n) |
| 109 | H | —CON[C₄H₉(i)]₂ | H | H | H | —C₂H₅ | —C₁₂H₂₅(n) |
| 110 | H | —CON[CH₂CH(C₂H₅)C₄H₉(n)]₂ | H | H | H | —CH₃ | —CH₂-ph |
| 111 | H | —CON[CH₂CH(C₂H₅)C₄H₉(n)]₂ | H | H | H | —CH₃ | —CH₂CH₂CH₂OCH(CH₃)₂ |
| 112 | H | —CON[CH₂CH(C₂H₅)C₄H₉(n)]₂ | H | H | H | —CH₃ | —C₁₃H₂₇(n) |
| 113 | H | —CON[CH₂CH(C₂H₅)C₄H₉(n)]₂ | H | H | H | —CH₃ | —C₁₄H₂₉(n) |
| 114 | H | —CON[CH₂CH(C₂H₅)C₄H₉(n)]₂ | H | H | H | —CH₃ | —C₁₆H₃₃(n) |
| 115 | H | —CON[CH₂CH(C₂H₅)C₄H₉(n)]₂ | H | H | H | —CH₃ | —C₁₈H₃₇(n) |
| 116 | H | —CON[CH₂CH(C₂H₅)C₄H₉(n)]₂ | H | H | H | —C₃H₇(n) | —C₈H₁₇(n) |
| 117 | H | —CON[CH₂CH(C₂H₅)C₄H₉(n)]₂ | H | H | H | —C₄H₉(n) | —C₈H₁₇(n) |
| 118 | H | —CON[CH₂CH(C₂H₅)C₄H₉(n)]₂ | H | H | H | —CH₃ | —C₈H₁₇(n) |
| 119 | H | —CON[CH₂CH(C₂H₅)C₄H₉(n)]₂ | H | H | H | —C₄H₉(n) | —C₁₄H₂₉(n) |

TABLE 2-continued

Formula (2)

| Coloring No. | R$_7$ | R$_8$ | R$_9$ | R$_{10}$ | R$_{11}$ | R$_{12}$ | R$_{13}$ |
|---|---|---|---|---|---|---|---|
| 120 | H | —CON[C$_{14}$H$_{29}$(n)]$_2$ | H | H | H | —CH$_3$ | —C$_8$H$_{17}$(n) |
| 121 | —CON[CH$_2$CH(C$_2$H$_5$)C$_4$H$_9$(n)]$_2$ | H | H | H | H | —CH$_3$ | —C$_{13}$H$_{27}$(n) |
| 122 | —CON[CH$_2$CH(C$_2$H$_5$)C$_4$H$_9$(n)]$_2$ | H | H | H | H | —CH$_3$ | —C$_{14}$H$_{29}$(n) |
| 123 | —CON[CH$_2$CH(C$_2$H$_5$)C$_4$H$_9$(n)]$_2$ | H | H | H | H | —CH$_3$ | —C$_{16}$H$_{33}$(n) |
| 124 | —CON[CH$_2$CH(C$_2$H$_5$)C$_4$H$_9$(n)]$_2$ | H | H | H | H | —C$_3$H$_7$(n) | —C$_8$H$_{17}$(n) |
| 125 | —CON[CH$_2$CH(C$_2$H$_5$)C$_4$H$_9$(n)]$_2$ | H | H | H | H | —C$_4$H$_9$(n) | —C$_8$H$_{17}$(n) |
| 126 | —CON[CH$_2$CH(C$_2$H$_5$)C$_4$H$_9$(n)]$_2$ | H | H | H | H | —C$_4$H$_9$(n) | —C$_{12}$H$_{25}$(n) |
| 127 | —CON[CH$_2$CH(C$_2$H$_5$)C$_4$H$_9$(n)]$_2$ | H | H | H | H | —C$_4$H$_9$(n) | —C$_{14}$H$_{29}$(n) |
| 128 | H | —CON[CH$_2$CH(C$_2$H$_5$)C$_4$H$_9$(n)]$_2$ | H | H | H | —C$_3$H$_7$(n) | —C$_8$H$_{17}$(n) |
| 129 | H | —CON[CH$_2$CH(C$_2$H$_5$)C$_4$H$_9$(n)]$_2$ | H | H | H | —C$_4$H$_9$(n) | —C$_8$H$_{17}$(n) |
| 130 | H | —CON[CH$_2$CH(C$_2$H$_5$)C$_4$H$_9$(n)]$_2$ | H | H | H | —C$_6$H$_{13}$(n) | —C$_8$H$_{17}$(n) |
| 131 | —CON[C$_{14}$H$_{29}$(n)]$_2$ | H | H | H | H | —C$_4$H$_9$(n) | —C$_8$H$_{17}$(n) |
| 132 | —CON[C$_{14}$H$_{29}$(n)]$_2$ | H | H | H | H | —CH$_3$ | —C$_{14}$H$_{29}$(n) |
| 133 | H | —CON[CH$_2$CH(C$_2$H$_5$)C$_4$H$_9$(n)]$_2$ | H | H | H | —CH$_3$ | —C$_8$H$_{17}$(n) |
| 134 | H | —CON[CH$_2$CH(C$_2$H$_5$)C$_4$H$_9$(n)]$_2$ | H | H | H | —CH$_3$ | —C$_{14}$H$_{29}$(n) |
| 135 | H | —CON[CH$_2$CH(C$_2$H$_5$)C$_4$H$_9$(n)]$_2$ | H | H | H | —CH$_3$ | —C$_{16}$H$_{33}$(n) |
| 136 | —CON[CH$_2$CH(C$_2$H$_5$)C$_4$H$_9$(n)]$_2$ | H | H | H | H | —C$_6$H$_{13}$(n) | —C$_8$H$_{17}$(n) |
| 137 | H | H | —COOCH$_2$CH(C$_2$H$_5$)C$_4$H$_9$(n) | H | H | —C$_4$H$_9$(n) | —CH$_3$ |
| 138 | H | H | —C$_8$H$_{17}$(n) | H | H | —CH$_3$ | —CH$_2$COOC$_6$H$_{18}$(n) |
| 139 | H | H | —C$_4$H$_9$(n) | H | H | —CH$_3$ | —CH$_2$COOC$_8$H$_{17}$(n) |
| 140 | H | H | —C$_4$H$_9$(i) | H | H | —CH$_3$ | —CH$_2$COOC$_8$H$_{17}$(n) |
| 141 | H | H | —C$_4$H$_9$(t) | H | H | —CH$_3$ | —CH$_2$COOC$_8$H$_{17}$(n) |
| 142 | H | H | —C$_6$H$_{13}$(n) | H | H | —CH$_3$ | —CH$_2$COOC$_8$H$_{17}$(n) |
| 143 | H | H | Cyclohexyl | H | H | —CH$_3$ | —CH$_2$COOC$_8$H$_{17}$(n) |
| 144 | H | H | —OC$_8$H$_{17}$(n) | H | H | —CH$_3$ | —CH$_2$COOC$_6$H$_{11}$(cyclo) |
| 145 | H | H | cyclohexyloxy | H | H | —CH$_3$ | —CH$_2$COOC$_{10}$H$_{21}$(n) |
| 146 | H | H | —COOCH$_2$COOC$_4$H$_9$(i) | H | H | —CH$_3$ | —CH$_2$COOC$_{10}$H$_{21}$(n) |
| 147 | H | H | —COOCH$_2$COOC$_5$H$_{11}$(i) | H | H | —CH$_3$ | —CH$_2$COOCH$_2$CH(C$_2$H$_5$)C$_4$H$_9$ |
| 148 | H | H | —COOCH$_2$COOC$_6$H$_{13}$(n) | H | H | —CH$_3$ | —CH$_2$COOCH$_2$-ph |
| 149 | H | H | —COOCH$_2$COOC$_8$H$_{17}$(n) | H | H | —CH$_3$ | —CH$_2$CONHC$_8$H$_{17}$(n) |
| 150 | H | H | —COOCH$_2$COOC$_2$H$_5$ | H | H | —CH$_3$ | —CH$_2$COOC$_8$H$_{17}$(n) |
| 151 | H | H | —COOC$_4$H$_9$(i) | H | H | —CH$_3$ | —CH$_2$CON[CH$_2$CH(C$_2$H$_5$)C$_4$H$_9$]$_2$ |
| 152 | H | H | —COOC$_5$H$_{11}$(i) | H | H | —CH$_3$ | —CH$_2$COOC$_{10}$H$_{21}$(n) |
| 153 | H | H | —COOC$_6$H$_{13}$(n) | H | H | —CH$_3$ | —CH$_2$CO—(3-methylphenoxy) |
| 154 | H | H | —COOC$_8$H$_{17}$(n) | H | H | —CH$_3$ | —CH$_2$CO—[4-(t-butyl)phenoxy] |
| 155 | H | H | —COOCH$_2$CH(C$_2$H$_5$)C$_4$H$_9$ | H | H | —CH$_3$ | —CH$_2$CO—(2,5-dimethylphenoxy) |
| 156 | H | H | —COOCH$_2$COOCH$_2$CH(C$_2$H$_5$)C$_4$H$_9$ | H | H | —CH$_3$ | —C$_2$H$_4$COOC$_4$H$_9$(i) |
| 157 | H | H | —COOC$_2$H$_4$CH(CH$_3$)CH$_2$C(CH$_3$)$_3$ | H | H | —CH$_3$ | —CH$_2$COOCH$_2$CH(C$_2$H$_5$)C$_4$H$_9$ |
| 158 | H | H | —COOCH$_2$-ph | H | H | —CH$_3$ | —CH$_2$COOC$_8$H$_{17}$(n) |
| 159 | H | H | —OCOCH$_2$CH(C$_2$H$_5$)C$_4$H$_9$ | H | H | —CH$_3$ | —CH$_2$COOCH$_2$-ph |

TABLE 2-continued

Formula (2)

| Coloring No. | R₇ | R₈ | R₉ | R₁₀ | R₁₁ | R₁₂ | R₁₃ |
|---|---|---|---|---|---|---|---|
| 160 | H | H | —OCOC₂H₄CH(CH₃)CH₂C(CH₃)₃ | H | H | —CH₃ | —C₂H₄COOC₄H₉(i) |
| 161 | H | H | —OCOC₄H₉(i) | H | H | —CH₃ | —CH₂COOC₈H₁₇(n) |
| 162 | H | H | —OCOC₈H₁₇(n) | H | H | —CH₃ | —CH₂COOC₁₀H₂₁(n) |
| 163 | H | H | —CONHCH₂CH(C₂H₅)C₄H₉ | H | H | —CH₃ | —CH₂CON[CH₂CH(C₂H₅)C₄H₉]₂ |
| 164 | H | H | —CONHC₈H₁₇(n) | H | H | —CH₃ | —CH₂CONHC₈H₁₇(n) |
| 165 | H | H | —CONHC₂H₄CH(CH₃)CH₂C(CH₃)₃ | H | H | —CH₃ | —CH₂COOCH₂CH(C₂H₅)C₄H₉ |
| 166 | —C₃H₇(i) | H | H | H | —C₃H₇(i) | —CH₃ | —CH₂COOCH₂CH(C₂H₅)C₄H₉ |
| 167 | —CH₃ | H | H | —C₄H₉(t) | —C₃H₇(i) | —CH₃ | —CH₂COOCH₂CH(C₂H₅)C₄H₉ |
| 168 | —C₄H₉(t) | H | H | H | H | —CH₃ | —CH₂COOC₈H₁₇(n) |
| 169 | —C₃H₇(i) | H | H | H | H | —CH₃ | —CH₂COOC₈H₁₇(n) |
| 170 | H | —C₃H₇(i) | H | H | H | —CH₃ | —C₂H₄COOCH₂CH(C₂H₅)C₄H₉ |
| 171 | H | H | —CONHCH₂CH(C₂H₅)C₄H₉ | H | H | —CH₃ | —CH₂CON[CH₂CH(C₂H₅)C₄H₉]₂ |
| 172 | H | H | —CONHCH₂CH(C₂H₅)C₄H₉ | H | H | —CH₃ | —CH₂COOC₈H₁₇(n) |
| 173 | H | H | —CONHCH₂CH(C₂H₅)C₄H₉ | H | H | —CF₃ | —CH₂COOCH₂CH(C₂H₅)C₄H₉ |
| 174 | H | H | —CONHCH₂CH(C₂H₅)C₄H₉ | H | H | —C₄H₉(n) | —CH₂COOCH₂CH(C₂H₅)C₄H₉ |
| 175 | H | —CF₃ | H | H | H | —CH₃ | —CH₂COOC₆H₁₃(n) |
| 176 | H | —CF₃ | F | H | H | —CH₃ | —C₂H₄COOC₄H₉(i) |
| 177 | H | —OC₄H₉(i) | —C₂H₅ | H | H | —CH₃ | —CH₂COOC₈H₁₇(n) |
| 178 | H | —C₂H₅ | —OCH₃ | H | —C₂H₅ | —CH₃ | —CH₂COOC₈H₁₇(n) |
| 179 | H | —OCH₃ | H | H | H | —CH₃ | —CH₂COOC₈H₁₇(n) |
| 180 | —C₂H₅ | H | H | H | H | —CH₃ | —C₂H₄CON[CH₂CH(C₂H₅)C₄H₉]₂ |
| 181 | H | —OCOCH₂CH(C₂H₅)C₄H₉ | H | H | H | —CH₃ | —CH₂COOC₈H₁₇(n) |
| 182 | H | —OCOC₂H₄CH(CH₃)CH₂C(CH₃)₃ | H | H | H | —CH₃ | —CH₂COOC₁₀H₂₁(n) |
| 183 | H | —COOCH₂CH(C₂H₅)C₄H₉ | H | H | H | —CH₃ | —CH₂COOCH₂CH(C₂H₅)C₄H₉ |
| 184 | H | —COOCH₂COOCH₂CH(C₂H₅)C₄H₉ | H | H | H | —CH₃ | —CH₂COOCH₂CH(C₂H₅)C₄H₉ |
| 185 | —C₄H₉(i) | H | H | H | H | —CH₃ | —CH₂COOCH₂CH(C₂H₅)C₄H₉ |
| 186 | —OC₄H₉(i) | H | H | H | H | —CH₃ | —CH₂COOCH₂CH(C₂H₅)C₄H₉ |
| 187 | —COOCH₂COOC₈H₁₇(n) | H | H | H | H | —CH₃ | —CH₂COOC₈H₁₇(n) |
| 188 | —COOC₅H₁₁(i) | H | H | H | H | —CH₃ | —CH₂COOC₈H₁₇(n) |
| 189 | —OCOCH₂CH(C₂H₅)C₄H₉ | H | H | H | H | —CH₃ | —CH₂COOC₈H₁₇(n) |
| 190 | —OCOC₂H₄CH(CH₃)CH₂C(CH₃)₃ | H | H | H | H | —CH₃ | —CH₂COOC₈H₁₇(n) |
| 191 | —COOCH₂COOCH₂CH(C₂H₅)C₄H₉ | H | H | H | H | —CH₃ | —C₂H₄CON[CH₂CH(C₂H₅)C₄H₉]₂ |
| 192 | —COOCH₂CH(C₂H₅)C₄H₉ | H | H | H | H | —CH₃ | —CH₂COOCH₂CH(C₂H₅)C₄H₉ |
| 193 | —CONHCH₂CH(C₂H₅)C₄H₉ | H | H | H | H | —CH₃ | —CH₂CONHCH₂CH(C₂H₅)C₄H₉ |
| 194 | —COOC₂H₄OCH(CH₃)₂ | H | H | H | H | —CH₃ | —CH₂COOC₂H₄OCH(CH₃)₂ |

The quinophthalone compounds represented by the formula (1) which are used in ink for ink-jet recording of the present invention are produced by conventionally known methods, for example, the processes disclosed in Japanese Patent Laid-Open Hei 39269/1993 and Japanese Patent Laid-Open Hei 292264/1995, etc. For example, these compounds can be prepared by the process comprising reacting 3-hydroxy-2-methyl-4-cinchonic acid derivatives represented by the formula (3) and phthalic anhydride derivatives represented by the formula (4).

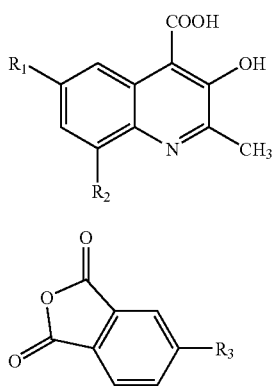

wherein $R_1$ to $R_3$ are the same as defined above.

The reaction between the compounds represented by the formula (3) and the compounds represented by the formula (4) is carried out at 150 to 230° C. for 1 to 20 hours in the presence of a high boiling solvent such as nitrobenzene, sulphorane, dichlorobenzene, N-methyl-2-pirrolidone and 1,3-dimethyl-2-imidazolidinone.

The compounds which $R_1$ to $R_3$ in the quinophthalone compound represented by the formula (1) is —$CONR_4R_5$ or —$COOR_6$ can be prepared by reacting the compounds of the formula (3) having the above substituents and the compounds represented by the formula (4) having the above substituents. The compounds also can be prepared by reacting the compounds represented by the formula (3) having carboxyl group and the compounds represented by the formula (4), and successively carrying out esterification or amidation.

The compounds in which $R_1$ to $R_3$ are alkylthio groups can be prepared by directly substituting with the alkyl thiol in the presence of an alkali from the compounds of the formula (1).

The compounds can also be prepared by reacting the compounds previously halogenated $R_1$ to $R_3$ in compounds of the formulas (3) and (4), and successively substituting the halogen with the alkyl thiol in the presence of an alkali. A process for preparing the compounds represented by the formula (1), however, is not limited by the above process.

The compounds represented by the formula (2) and used for ink for ink-jet recording of the present invention, for example, can be prepared by coupling the anilines represented by the formula (5) and pyridones represented by the formula (6) according to a conventionally known coupling method.

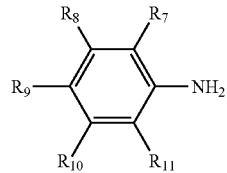

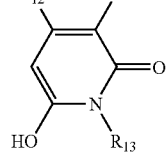

wherin $R_7$ to $R_{13}$ are the same as above.

Specifically, the compounds represented by the formula (2) are obtained, for example, by adding sodium nitrite aqueous solution to anilines represented by the formula (5) in hydrochloric acid, and successively adding the resulting diazo compounds to pyridones represented by the formula (6) for azo coupling reaction, and separating the thus-obtained product through filtration. A process for preparing the compounds represented by the formula (2), however, is not limited by the above process.

The compounds of the present invention are useful in various kind of ink, especially as a yellow hue coloring matter for ink-jet recording system. The coloring matter can be used as such. However, when it is used in the ink-jet recording system in particular, it may be purified by desalting treatment, for example, with an ion exchange resin or through ultrafiltration, or by column chromatography in order to prevent clogging of a jet nozzle in a recording apparatus owing to impurities or inorganic materials contained in the coloring matter.

The ink for ink-jet recording of the present invention contains at least one yellow hue coloring matter selected from the group consisting of a quinophthalone compound represented by the formula (1) and a pyridone azo compound represented by the formula (2), water and a resin as main components, namely, as essential components, and, if necessary, further other components, for example, additives such as a dispersant and an emulsifying agent and auxiliaries. It takes the form of an emulsion by dispersing the resin fine particles colored with the coloring matter of the present invention in an aqueous medium and emulsifying the dispersion.

The ink for ink-jet recording of the present invention may contain an organic solvent and additives as required. The coloring matters represented by the formula (1) and the formula (2) may be used either singly or in combination, or may be mixed with other coloring matters having a different structure.

In the ink for ink-jet recording of the present invention, the resin constituting the resin fine particles can be a resin having an ionic group on the surface. For example, various resins such as a polyester resin, a vinyl polymer, a styrenic resin, a styrene-acrylic copolymer and a polyurethane resin are available.

(a) The polyester resin comprises polycarboxylic acids and polyhydric alcohols. A resin obtained by the polymerization of one or more polycarboxylic acids and one or more polyhydric alcohols is mentioned.

Polycarboxylic acids are not particularly limited. Examples thereof include aromatic polycarboxylic acids, aromatic oxycarboxylic acids, aliphatic dicarboxylic acids and alicyclic dicarboxylic acids such as terephthalic acid, isophthalic acid, o-phthalic acid, 1,5-naphthalenedicarboxylic acid, 2,6-naphthalenedicarboxylic acid, diphenic acid, sulfoterephthalic acid, 5-sulfoisophthalic acid, 4-sulfophthalic acid, 4-sulphonaphthalene-2,7-dicarboxylic acid, 5-[4-sulfophenoxy]isophthalic acid, sulphoterephtalic acid, p-oxybenzoic acid, p-(hydroxyethoxy)benzoic acid, succinic acid, adipic acid, azelaic acid, sebacic acid, dodecanedicarboxylic acid, fumaric acid, maleic acid, itaconic acid, hexahydrophthalic acid, tetrahydrophthalic acid, trimellitic acid, trimesic acid and pyromellitic acid. These can also be used as metal salts and ammonium salts.

The polyhydric alcohols are not particularly limited. Examples thereof include aliphatic polyhydric alcohols, alicyclic polyhydric alcohols and aromatic polyhydric alcohols such as ethylene glycol, propylene glycol, 1,3-propanediol, 2,3-butanediol, 1,4-butanediol, 1,5-pentanediol, 1,6-hexanediol, neopentyl glycol, diethylene glycol, dipropylene glycol, 2,2,4-trimethyl-1,3-pentanediol, polyethylene glycol, polypropylene glycol, polytetramethylene glycol, trimethylolethane, trimethylolpropane, glycerin, pentaerythritol, 1,4-cyclohexanediol, 1,4-cyclohexanedimethanol, spiroglycol, tricyclodecanediol, tricyclodecanedimethanol, m-xylene glycol, o-xylene glycol, 1,4-phenylene glycol, bisphenol A and lactone-type polyester polyols.

With respect to the polyester resin obtained by polymerizing one or more of the polycarboxylic acids and one or more of the polyhydric alcohols, a resin in which a polar group in the end of the high-molecular chain is blocked with a known compound capable of blocking an end is also available.

(b) The vinyl polymer, the styrenic resin and the styrene-acrylic copolymer are not particularly limited. For example, those obtained from the following polymerizable monomers are mentioned.

Examples of the polymerizable monomers include vinyl aromatic hydrocarbons such as styrene, o-methylstyrene, m-methylstyrene, p-methylstyrene, α-methylstyrene, p-ethylstyrene, 2,4-dimethylstyrene, p-tert-butylstyrene, p-chlorostyrene and divinylbenzene; (meth)acrylic acid esters such as methyl acrylate, ethyl acrylate, butyl acrylate, n-propyl acrylate, isopropyl acrylate, n-butyl acrylate, isobutyl acrylate, tert-butyl acrylate, n-pentyl acrylate, isopentyl acrylate, neopentyl acrylate, 3-(methyl)butyl acrylate, 2-ethylhexyl acrylate, cyclohexyl acrylate, hexyl acrylate, octyl acrylate, nonyl acrylate, decyl acrylate, undecyl acrylate, dodecyl acrylate, phenyl acrylate, methyl methacrylate, n-propyl methacrylate, isopropyl methacrylate, n-butyl methacrylate, isobutyl methacrylate, tert-butyl methacrylate, n-pentyl methacrylate, isopentyl methacrylate, neopentyl methacrylate, 3-(methyl)butyl methacrylate, 2-ethylhexyl methacrylate, hexyl methacrylate, octyl methacrylate, nonyl methacrylate, decyl methacrylate, undecyl methacrylate and dodecyl methacrylate; unsaturated carboxylic acids such as acrylic acid, methacrylic acid, itaconic acid and maleic acid; (meth)acrylamide; n-substituted maleimide; maleic anhydride; (meth)acrylonitrile; vinyl ketone; vinyl acetate; and vinylidene chloride. Resins obtained by polymerizing one or more of these monomers are mentioned.

(c) The polyurethane resin comprises isocyanates and compounds with a functional group capable of reacting with isocyanates. A resin obtained by polymerizing one or more of the isocyanates and one or more of the compounds is mentioned.

Examples of the isocyanates include:

aliphatic polyisocyanates such as ethylene diisocyanate, trimethylene diisocyanate, tetramethylene diisocyanate, hexamethylene diisocyanate, octamethylene diisocyanate, nonamethylene diisocyanate, 2,2-dimethylpentane diisocyanate, 2,2,4-trimethylhexamethylene diisocyanate, decamethylene diisocyanate, butenediisocyanate, 1,3-butadiene-1,4-diisocyanate, 2,4,4-trimethylhexamethylene diisocyanate, 1,6,11-undecatriisocyanate, 1,3,6-hexamethylene triisocyanate, 1,8-diisocyanato-4-isocyanatomethyloctane, 2,5,7-trimethyl-1,8-diisocyanato-5-isocyanatomethyloctane, bis(isocyanatoethyl) carbonate, bis(isocyanatoethyl) ether, 1,4-butylene glycol dipropyl ether-ω,ω'-diisocyanate, lysine diisocyanatomethyl ester, lysine triisocyanate, 2-isocyanatoethyl-2,6-diisocyanatoethyl-2,6-diisocyanatohexanoate, 2-isocyanatopropyl-2,6-diisocyanatohexanoate, xylylene diisocyanate, bis(isocyanatoethyl)benzene, bis(isocyanatopropyl)benzene, α,α,α',α'-tetramethylxylylene diisocyanate, bis(isocyanatobutyl)benzene, bis(isocyanatomethyl)naphthalene, bis(isocyanatomethyl)diphenyl ether, bis(isocyanatoethyl) phthalate, mesitylene triisocyanate and 2,6-di(isocyanatomethyl)furan;

alicyclic polyisocyanates such as isophorone diisocyanate, bis(isocyanatomethyl)cyclohexane, dicyclohexylmethane diisocyanate, cyclohexane diisocyanate, methylcyclohexane diisocyanate, dicyclohexyldimethylmethane diisocyanate, 2,2-dimethyldicyclohexylmethane diisocyanate, bis(4-isocyanato-n-butylidene) pentaerythritol, dimer acid diisocyanate, 2-isocyanatomethyl-3-(3-isocyanatopropyl)-5-isocyanatomethylbicyclo[2,2,1]-heptane, 2-isocyanatomethyl-3-(3-isocyanatopropyl)-6-isocyanatomethylbicyclo[2,2,1]heptane, 2-isocyanatomethyl-2-(3-isocyanatopropyl)-5-isocyanatomethylbicyclo[2,2,1]heptane, 2-isocyanatomethyl-2-(3-isocyanatopropyl)-6-isocyanatomethylbicyclo[2,2,1]heptane, 2-isocyanatomethyl-3-(3-isocyanatopropyl)-6-(2-isocyanatoethyl)bicyclo[2,2,1]heptane, 2-isocyanatomethyl-3-(3-isocyanatopropyl)-6-(2-isocyanatoethyl)bicyclo[2,1,1]heptane, 2-isocyanatomethyl-2-(3-isocyanatopropyl)-5-(2-isocyanatoethyl)bicyclo[2,1,1]heptane, 2-isocyanatomethyl-2-(3-isocyanatopropyl)-6-(2-isocyanatoethyl)bicyclo[2,2,1]heptane and norbornanebis(isocyanatomethyl);

aromatic polyisocyanates such as phenylene diisocyanate, tolylene diisocyanate, ethylphenylene diisocyanate, isopropylenephenylene diisocyanate, dimethylphenylene diisocyanate, diethylphenylene diisocyanate, diisopropylphenylene diisocyanate, trimethylbenzene triisocyanate, benzene triisocyanate, naphthalene diisocyanate, methylnaphthalene diisocyanate, biphenyl diisocyanate, tolidine diisocyanate, 4,4'-diphenylmethane diisocyanate, 3,3'-dimethyldiphenylmethane-4,4'-diisocyanate, bibenzyl-4,4'-diisocyanate, bis(isocyanatophenyl)ethylene, 3,3'-dimethoxybiphenyl-4,4'-diisocyanate, triphenylmethane triisocyanate, polymeric MDI, naphthalene triisocyanate, diphenylmethane-2,4,4'-triisocyanate, 3-methyldiphenylmethane-4,6,4'-triisocyanate, 4-methyldiphenylmethane-3,5,2',4',6'-pentaisocyanate, phenylisocyanatomethyl isocyanate, phenylisocyanatoethyl isocyanate, tetrahydronaphthylene diisocyanate, hexahydrobenzene diisocyanate, hexahydrodiphenylmethane-4,4'-diisocyanate, diphenyl ether diisocyanate, ethylene glycol diphenyl ether diisocyanate, 1,3-propylene glycol diphenyl ether diisocyanate, benzophenone diisocyanate, diethylene glycol diphenyl ether diisocyanate, dibenzofuran diisocyanate, carbazole diisocyanate, ethylcarbazole diisocyanate and dichlorocarbazole diisocyanate;

sulfur-containing aliphatic isocyanates such as thiodiethyl diisocyanate, thiopropyl diisocyanate, thiodihexyl diisocyanate, dimethylsulfone diisocyanate, dithiodimethyl diisocyanate, dithiodiethyl diisocyanate, dithiopropyl diisocyanate and dicyclohexylsulfide-4,4'-diisocyanate;

aromatic sulfide-type isocyanates such as diphenylsulfide-2,4'-diisocyanate, diphenylsulfide-4,4'-diisocyanate, 3,3'-dimethoxy-4,4'-diisocyanatodibenzyl thioether, bis(4-isocyanatomethylbenzene) sulfide and 4,4'-methoxybenzenethioethyleneglycol-3,3'-diisocyanate;

aromatic disulfide-type isocyanates such as diphenyldisulfide-4,4'-diisocyanate, 2,2'-dimethyldiphenyldisulfide-5,5'-diisocyanate, 3,3'-dimethyldiphenyldisulfide-5,5'-diisocyanate, 3,3'-dimethyldiphenyldisulfide-6,6'-diisocyanate, 4,4'-dimethyldiphenyldisulfide-5,5'-diisocyanate, 3,3'-dimethoxydiphenyldisulfide-4,4'-diisocyanate and 4,4'-dimethoxydiphenyldisulfide-3,3'-diisocyanate;

aromatic sulfone-type isocyanates such as diphenylsulfone-4,4'-diisocyanate, diphenylsulfone-3,3'-diisocyanate, benzidinesulfone-4,4'-diisocyanate, diphenylmethanesulfone-4,4'-diisocyanate, 4-methyldiphenylmethanesulfone-2,4'-diisocyanate, 4,4'-dimethoxydiphenylsulfone-3,3'-diisocyanate, 3,3'-dimethoxy-4,4'-diisocyanatodibenzylsulfone, 4,4'-dimethyldiphenylsulfone-3,3'-diisocyanate, 4,4'-di-tert-butyldiphenylsulfone-3,3'-diisocyanate, 4,4'-methoxybenzeneethylenedisulfone-3,3'-diisocyanate and 4,4'-dichlorodiphenylsulfone-3,3'-diisocyanate;

sulfonic acid ester-type isocyanates such as 4-methyl-3-isocyanatobenzenesulfonyl-4'-isocyanatophenol ester and 4-methoxy-3-isocyanatobenzenesulfonyl-4'-isocyanatophenol ester;

aromatic sulfonic acid amides such as 4-methyl-4'-isocyanate, dibenzenesulfonylethylenediamine-4,4'-diisocyanate, 4,4'-methoxybenzenesulfonylethylenediamine-3,3'-diisocyanate and 4-methyl-3-isocyanatobenzenesulfonylanilide-4-methyl-3'-isocyanate; and sulfur-containing heterocyclic compounds such as thiophene-2,5-diisocyanate, thiophene-2,5-diisocyanatomethyl, 1,4-dithian-2,5-diisocyanate and 1,4-dithian-2,5-diisocyanatomethyl.

Examples of the compounds with a functional group capable of reacting with the isocyanates include:

polyol compounds: aliphatic polyols such as ethylene glycol, diethylene glycol, triethylene glycol, tetraethylene glycol, propylene glycol, dipropylene glycol, butylene glycol, neopentyl glycol, glycerin, trimethylolethane, trimethylolpropane, butanetriol, 1,2-methylglycoside, pentaerythritol, dipentaerythritol, tripentaerythritol, sorbitol, erythritol, threitol, ribitol, arabinitol, xylitol, allitol, mannitol, dolucitol, iditol, glycol, inositol, hexanetriol, triglycerol, diglycerol, polyethylene glycol, polypropylene glycol, polytetraethylene ether glycol, tris(2-hydroxyethyl) isocyanurate, cyclobutanediol, cyclopentanediol, cyclohexanediol, cycloheptanediol, cyclooctanediol, cyclohexanedimethanol, hydroxypropylcyclohexanol, tricyclo[5,2,1,0,$^{2,6}$]decanedimethanol, bicyclo[4,3,0]nonanediol, dicyclohexanediol, tricyclo[5,3,1,1]dodecanediol, bicyclo[4,3,0] nonanedimethanol, tricyclo[5,3,1,1]dodecane-ethanol, hydroxypropyltricyclo[5,3,1,1]dodecanol, spiro[3,4]octanediol, 1,1'-bicyclohexylidenediol, cyclohexanetriol, maltitol and lactitol;

aromatic polyols such as dihydroxynaphthalene, trihydroxynaphthalene, tetrahydroxynaphthalene, dihydroxybenzene, benzenetriol, biphenyltetraol, pyrogallol, (hydroxynaphthyl)pyrogallol, trihydroxyphenanthrene, bisphenol A, bisphenol F, xylylene glycol, di(2-hydroxyethoxy)benzene, bisphenol A-bis(2-hydroxyethyl ether), tetrabromobisphenol A, tetrabromobisphenol A-bis(2-hydroxyethyl ether) and bisphenol S;

halogenated polyols such as dibromoneopentyl glycol, polyester polyols, polycaprolactones, polythioether polyols, polyacetal polyols, polycarbonate polyols, polycaprolactone polyols, polythioether polyols, polybutadiene polyols, furandimethanol, condensation reaction products of organic acids such as oxalic acid, glutamic acid, adipic acid, acetic acid, phthalic acid, isophthalic acid, salicylic acid and pyromellitic acid and the polyols, addition reaction products of the polyols and alkylene oxides such as ethylene oxide and propylene oxide, addition reaction products of alkylene polyamines and alkylene oxides, 2,2-dimethylollactic acid, 2,2-dimethylolpropionic acid, 2,2-dimethylolbutanoic acid, 2,2-dimethylolvaleric acid, 3,4-diaminobutanesulfonic acid, 3,6-diamino-2-toluenesulfonic acid and their caprolactone modified products;

2-mercaptoethanol, 3-mercapto-1,2-propanediol, glycerin di(mercaptoacetate), 1-hydroxy-4-mercaptocyclohexane, 2,4-dimercaptophenol, 2-mercaptohydroquinone, 4-mercaptophenol, 1,3-dimercapto-2-propanol, 2,3-dimercapto-1,3-butanediol, pentaerythritol tris(3-mercaptopropionate), pentaerythritol mono(3mercaptopropionate), pentaerythritol tris (thioglycolate), pentaerythritol pentakis(3-mercaptopropionate), hydroxymethyltris (mercaptoethylthiomethyl)methane, 1-hydroxyethylthio-3-mercaptoethylthiobenzene, 4-hydroxy-4'-mercaptodiphenylsulfone, 2-(2-mercaptoethylthio)ethanol, dihydroxyethylsulfide mono(3-mercaptopropionate), dimercaptoethane mono(salicylate) and hydroxyethylthiomethyl-tris(mercaptoethylthio)methane.

Further, polyamino compounds such as ethylenediamine, diethylenetriamine, triethylenetetramine, propylenediamine, butylenediamine, hexamethylenediamine, cyclohexylenediamine, piperazine, 2-methylpiperazine, phenylenediamine, tolylenediamine, xylylenediamine, α,α'-methylenebis(2-chloroaniline)-3,3'-dichloro-α,α'-biphenylamine, m-xylenediamine, isophoronediamine, N-methyl-3,3'-diaminopropylamine and norbornenediamine;

polythiol compounds, α-amino acids such as serine, lysine and histidine; and halo-substituted products of these active hydrogen compounds can also be used. These may be used either singly or in combination.

These resins can also be used either singly or in combination, but they are not critical at all.

The resin containing the ionic group on the surface exhibits the excellent water dispersibility.

Examples of the ionic group include a sulfonic acid group, a carboxylic acid group, a sulfuric acid group, a phosphoric acid group, a phosphonic acid group, a phosphinic acid group, alkali metal salt groups or ammonium salt groups thereof, and primary to tertiary amine groups. A carboxylic acid alkali metal salt group, a carboxylic acid ammonium salt group, a sulfonic acid alkali metal salt group and a sulfonic acid ammonium salt group are preferable. A sulfonic acid alkali metal salt group and a sulfonic acid ammonium salt group are especially preferable in view of the water dispersion stability. The introduction of the ionic group can be conducted by adding a monomer having an ionic group in the formation of the resin.

For example, when a carboxylic acid alkali metal salt group or a carboxylic acid ammonium salt group is introduced into a polyester resin as an ionic group, a method can be employed in which a polycarboxylic acid such as trimellitic acid is introduced into a system at the terminal stage of the polymerization of a polyester to add a carboxyl group to an end of a resin, and this group is further neutralized with ammonia or sodium hydroxide to convert the same into a carboxylic acid salt group.

Moreover, when a sulfonic acid alkali metal salt group or a sulfonic acid ammonium salt group is introduced into polyester resin fine particles as an ionic group, a mono- or di-carboxylic acid having a sulfonic acid alkali metal salt group or a sulfonic acid ammonium salt group can be introduced into a system to introduce this ionic group into the polyester resin.

As the salt, an ammonium ion, Li, Na, K, Mg, Ca, Cu and Fe are mentioned. K and Na are especially preferable.

The present invention includes the resin fine particles colored with at least one coloring matter selected from the group consisting of a compound represented by formula (1) and a compound represented by the formula (2), the dispersion obtained by dispersing the resin fine particles in the aqueous medium, and the ink for ink jet recording which is the emulsion resulting from the emulsification through the dispersion.

The resin fine particles colored with the coloring matter of the present invention can be produced by the following methods.

1. Method in which the coloring matter is dissolved or dispersed in the polymerizable monomer, and emulsion polymerization is then conducted.

2. Method in which after a resin is obtained by polymerization of the polymerizable monomer, the coloring matter is directly added thereto, and additives are further added as required to uniformly dissolve or disperse the same for coloration.

3. Method in which a material obtained by dissolving or dispersing the coloring matter in a water-soluble organic solvent (for example, acetone, methyl ethyl ketone, tetrahydrofuran or dioxane) or an ordinary film-forming aid (such as texanol or N,N-dimethylpyrrolidone) is added to the resin obtained by the polymerization, additives are added as required, and these are uniformly dissolved or dispersed for coloration.

4. Method in which a material obtained by dissolving or dispersing the coloring matter in a water-insoluble organic solvent (for example, toluene) is added to the resin obtained by the polymerization, additives are added as required, and these are uniformly dissolved or dispersed, and water is further added to form a water dispersion and conduct emulsification, and the water-insoluble organic solvent is then distilled off as required for coloration.

5. Method in which after obtaining the water dispersion of the resin, coloration is conducted by a high-temperature dying method in which the coloring matter for ink jet recording is added thereto and the mixture is treated at a high temperature.

With respect to the resin fine particles colored with the coloring matter which are produced by these methods, the particle diameter is not particularly limited. In the dispersion obtained by dispersing the same in an aqueous medium using a dispersing agent, the smaller particle diameter is preferred. When the particles are used as the dispersion of the coloring matter for ink jet recording, the average particle diameter is between 0.01 and 1 µm, preferably between 0.05 and 0.8 µm. Further, the production of the dispersion obtained by dispersing the resin fine particles colored with the coloring matter in the aqueous medium is not particularly limited. A dispersion having a desired composition can be obtained using a dispersing agent selected according to the application of the dispersion.

In the colored resin fine particles, the coloring matter is influenced by the compatibility of the coloring matter with the resin, and it includes a coloring matter which is uniformly dissolved in the resin and a coloring matter which is partially uniformly dispersed in or adhered to the surface of the resin. A coloring matter which is uniformly dissolved in the resin is preferable. The amount of the coloring matter relative to the resin is usually between 1 and 90% by weight, preferably between 5 and 50% by weight. However, it is not particularly limited.

The colored resin fine particles or the dispersion thereof can be used as various coloring and recording materials upon making the most of the hydrophobic nature thereof. Further, the ink for ink jet recording can be produced as an emulsion by emulsifying the same.

The ink for ink jet recording of the invention is an emulsion in which the coloring matter represented by formula (1) and/or the coloring matter represented by the formula (2) (hereinafter, simply refer as "coloring matter for ink-jet recording"), the resin and water are used as essential components, and it can be produced by the following methods.

1. Method in which after the coloring matter for ink jet recording is dissolved or dispersed in the polymerizable monomer, the emulsion polymerization is conducted, additives are added thereto as required, these are uniformly dissolved or dispersed, and water is further added to form a water dispersion and conduct emulsification.

2. Method in which after a resin is obtained by polymerization, the coloring matter for ink jet recording is directly added thereto, additives are added as required to uniformly dissolve or disperse the same, and water is further added to form a water dispersion and conduct emulsification.

3. Method in which a material obtained by dissolving or dispersing the coloring matter for ink jet recording in a water-soluble organic solvent (for example, acetone, methyl ethyl ketone, tetrahydrofuran or dioxane) or an ordinary film-forming aid (such as texanol or N,N-dimethylpyrrolidone) is added to the resin obtained by the polymerization, additives are added thereto as required, these are uniformly dissolved or dispersed, water is further added to form a water dispersion and conduct emulsification, and the water-soluble organic solvent is then distilled off as required.

4. Method in which a material obtained by dissolving or dispersing the coloring matter for ink jet recording in a water-insoluble organic solvent (for example, toluene) is added to the resin obtained by the polymerization, additives are added thereto as required, these are uniformly dissolved or dispersed, water is further added to form a water dispersion and conduct emulsification, and the water-insoluble organic solvent is then distilled off as required.

5. Method in which after obtaining the water dispersion of the resin, the resin is colored by a high-temperature dying method in which the coloring matter for ink jet recording is added thereto and the mixture is treated at a high temperature, and the water dispersion of the colored resin fine particles is emulsified.

In the production, filtration with a microporous filter such as a membrane filter is sometimes conducted to remove insoluble matters.

With respect to the colored resin fine particles in the water dispersion obtained by emulsification ("the resin fine particles colored with the coloring matter" is sometimes simply referred to as "the colored resin fine particles"), the average particle diameter is preferably between 0.01 and 1 µm, more preferably between 0.05 and 0.8 µm. When the average particle diameter is too small, there is a possibility of decreasing the image density or the water resistance. When it is too large, there is a possibility that the dispersion stability in ink is decreased to form a precipitate, as a results, the storage stability is decreased, or that clogging of a nozzle occurs.

The amount of the coloring matter in the colored resin fine particles depends on the use, the aim, the types of the coloring matter, the ink composition, the printing density of the ink and the clogging property. The amount of the coloring matter in the resin is between 1 and 90% by weight, preferably between 5 and 50% by weight.

When the amount of the coloring matter is small, a large amount of ink is required to obtain a satisfactory recorded image, exerting a load on a printing head of a recording device or recording paper. When it is large, the coloring matter tends to be precipitated from the resin particles to form a precipitate in the ink, inducing the clogging of the printing head.

The ink for ink-jet recording of the present invention (hereinafter simply referred as "ink") may contain, for adjusting the color tone of the ink, other coloring matters, and known dyes or pigments treated in the form of an emulsion or a fine dispersion so as not to impair ink characteristics.

The amount of the colored resin fine particles in the ink is between 1 and 70% by weight, preferably between 5 and 50% by weight.

The ink of the invention can contain a water-soluble organic solvent, as required, for adjusting the wettability, the surface tension, the viscosity and the drying rate of the ink.

Examples of the water-soluble organic solvent include polyhydric alcohols such as ethylene glycol, diethylene glycol, triethylene glycol, polyethylene glycol, propylene glycol, polypropylene glycol, 1,3-propanediol, glycerin and thioglycol; polyhydric alcohol ethers such as ethylene glycol monoethyl ether, ethylene glycol monobutyl ether, diethylene glycol monobutyl ether, dipropylene glycol monoethyl ether and triethylene glycol monomethyl ether; ketones such as acetone and methyl ethyl ketone; amides such as N,N-dimethylformamide, N,N-diethylformamide and N,N-dimethylacetamide; nitrogen-containing compounds such as 2-pyrrolidone, N-methyl-2-pyrrolidone, N-vinyl-2-pyrrolidone and 1,3-dimethyl-2-imidazolidinone; ethers such as tetrahydrofuran and dioxane; alcohols such as methanol, ethanol, 1-propanol, 2-propanol, 1-butanol and 2-butanol; and glycerin. When the water-soluble organic solvent is used, it is advisable that the amount thereof is between 1 and 20% by weight based on the total amount of the ink.

In order to improve the storage stability of the ink, it is advisable to adjust pH to between 7 and 10. Examples of a pH adjustor include $NaHCO_3$, $Na_2B_4O_7$, alkanolamines such as ethanolamine, diethanolamine and triethanolamine, and alkali metal hydroxides such as potassium hydroxide and lithium hydroxide.

The ink of the present invention can contain, as required, various additives used so far. Examples of the additives include an ultraviolet absorber, an antioxidant, a dispersing agent, a dispersion stabilizer, a chelating agent, a water-soluble polymer, a masking agent, a rustproofing agent, an antiseptic, a viscosity modifier, a surfactant, a surface-tension modifier, a pH adjustor, a specific resistance modifier, a near infrared absorber and a penetrant.

The ink of the present invention comprising the components can be used as the ink for ink jet recording system and also as ink for writing or marking instrument. It is excellent in the recording characteristics, the storage stability, the fixability to the recording medium, the vividness of the recorded image, the light resistance and the water resistance.

Since the coloring matter used in the invention has the high solubility in the organic solvent, it can also be used in solvent-type jet ink for textile printing or printing.

EXAMPLE

The invention is illustrated more specifically by referring to the following Examples. However, the invention is not limited thereto. Incidentally, "parts" in Examples are on the weight basis.

Coloring Matter Production Example 1

Coloring matter No. 1 in Table 1 was produced by the following process.

285 Parts of sulfolane was added to 21.1 parts of trimellitic anhydride, and the solution was heated to 185° C. Further, 24.6 parts of 3-hydroxy-2-methyl-6-isopropylquinoline-4-carboxylic acid was added to the solution, and reacted at 200° C. for 1 hour.

37.2 Parts of the compound of the formula (7) which is the precursor of the desired product was obtained.

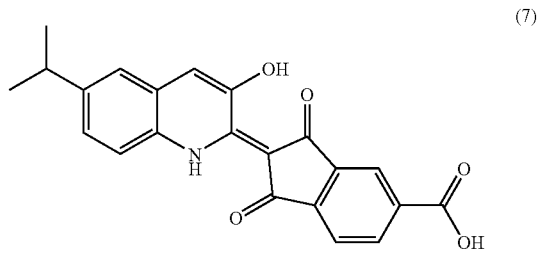

(7)

5 Parts of the compound of the formula (7) was added to 25 parts of o-dichlorobenzene, the mixture was heated at 100° C. 3.6 Parts of thionyl chloride was added dropwise to the mixture and maintained at the temperature for 2.5 hours and excess thionyl chloride was distilled off under reduced pressure. Further, 15 parts of di(2-ethylhexyl)amine was added dropwise at 100° C. and maintained at the temperature while stirring for 2 hours and then was cooled to room temperature.

The resulting reaction mixture was discharged in 50 parts of methanol to obtain 6 parts of the coloring matter No. 1 represented by the formula (8);

Maximum absorption wavelength (λmax) of the coloring matter in

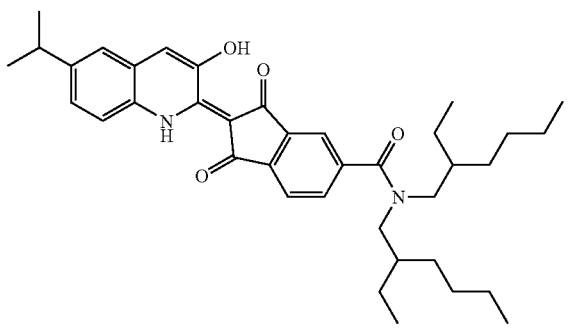

(8)

toluene was 453 nm and 429 nm, and gram absorptibity coefficient (εg) in 453 nm was 90600 ml/g cm. The elemental analysis values of the compound were shown below.

| Elemental analysis | | | |
|---|---|---|---|
|  | C | H | N |
| found (%) | 76.3 | 8.4 | 4.6 |
| calculated (%) | 76.2 | 8.4 | 4.7 |

The compound had high solvent solubility, and had 30% or more solubility in toluene at room temperature.

Coloring Matter Production Example 2

The coloring matter of No. 118 in the table 2 was prepared as below.

26.7 Parts of m-nitrobenzoyl chloride was added to 100 parts of toluene and further 34.8 parts of di-2-ethylhexylamine and 11.4 parts of pyridine and then reacted for four hours. Subsequently, the reaction mixtures were filtered and removed precipitated solid by filtration, and then 56.2 parts of the compound represented by the formula (9),

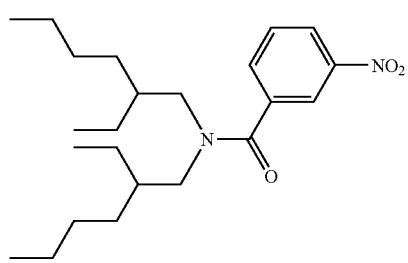

(9)

which is the precursor of the desired compound, was obtained by concentration of the filtrate.

53.0 Parts of the compound of the formula (9) was added to 250 parts of dimethylformamide and further 100 parts of 20% aqueous solution of sodium hydrosulfide was added and reacted at 70° C. for 2 hours, and then the reaction mixture was cooled to 30° C. The reaction mixture was discharged in 250 parts of water and was added to 100 parts of toluene. After mixing and standing the mixture, the upper layer was extracted and concentrated to obtain 46.5 parts of the compound represented by the formula (10) which is the precursor of the desired product.

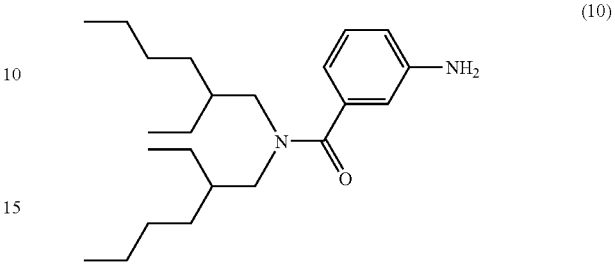

(10)

39.6 Parts of n-octyl amine and 17.0 parts of cyano ethyl acetate were mixed and reacted for 2 hours. Subsequently, 30 parts of water and 29.8 parts of 3-oxysoenanto acid ethyl was charged to the mixture and reacted at 90° C. for 2 hours. The reaction mass was discharged in 400 parts of 3% aqueous solution of sulfuric acid, and further 100 parts of toluene was added, after mixing and standing, upper layer was extracted and concentrated to obtain 40.8 parts of the compound represented by the formula (11), precursor of the desired product;

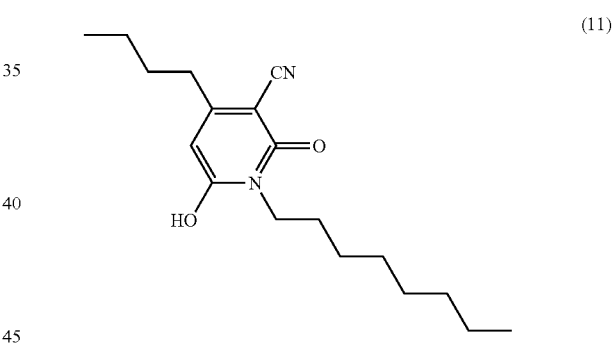

(11)

14.3 Parts of the compound of the formula (10) and 29 parts of 11% aqueous solution of hydrochloric acid was added to 100 parts of methanol, and was cooled to 10° C. or less while stirring. Subsequently, 11 parts of 30% aqueous solution of sodium nitrite was added and reacted for 1 hour, and further 0.18 parts of sulfamic acid was added and stirred at 10° C. or less for 30 minutes (solution of diazonium salt). On the other hand, 100 parts of methanol, 12.1 parts of the compound of the formula (11) and 30 parts of 6% aqueous solution of sodium hydroxide were mixed and then were cooled to 10° C. or less.

The above solution of diazonium salt was added to the mixture and reacted for 3 hours. After charging 500 parts of water to the mixture and stirring. The supernatant was removed by decantation and only tar constituent was taken out. Purification of the constituent was carried out with column chromatography to obtain 12.7 parts of the coloring matter of No 118 represented by the formula (12);

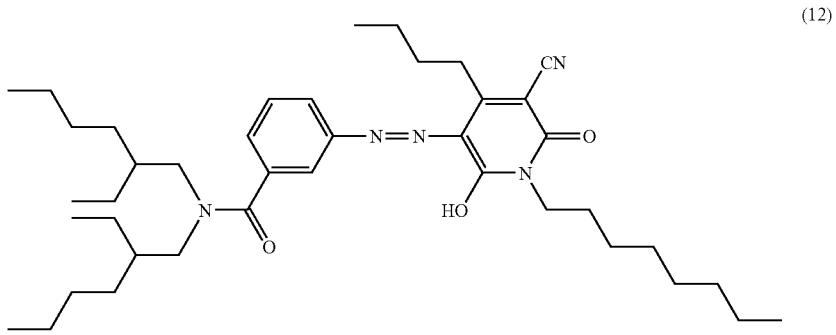

(12)

Maximum absorption wavelength (λmax) of the coloring matter in toluene was 432 nm, and gram absorptibity coefficient (εg) in 432 nm was 62000 ml/g cm. The elemental analysis values of the compound were shown below.

| | Elemental analysis | | |
|---|---|---|---|
| | C | H | N |
| found (%) | 72.6 | 9.5 | 10.5 |
| calculated (%) | 72.8 | 9.6 | 10.4 |

The compound had high solvent solubility, and had 30% or more solubility in toluene at room temperature.

Example 1

Production Example of Colored Resin Fine Particles and a Dispersion (A) Thereof

To an autoclave equipped with a thermometer and a stirrer, 180 parts of dimethyl terephthalate, 10 parts of pentasodium sulfoisophthalic acid dimethyl ester, 130 parts of ethylene glycol, 25 parts of tricyclodecanedimethanol and 0.1 part of tetrabutoxytitanate was charged, and the mixture was heated at 180 to 220° C. for approximately 3 hours for transesterification. Subsequently, the reaction mixture was heated to 240° C., the pressure in the autoclave was then lowered slowly to 10 mmHg, and the reaction was continued for 1 hour. The pressure in the autoclave was returned to atmospheric pressure to obtain a copolyester resin.

Then, 100 parts of the resulting polyester resin, 150 parts of methyl ethyl ketone, 150 parts of tetrahydrofuran and 10 parts of the coloring matter for ink-jet recording indicated at No. 1 in Table 1 were mixed. Thereafter, 600 parts of deionized water was added thereto, and these were further mixed. This mixture was filtered through a 0.8-micron membrane filter, and heated to distill off the solvent. After cooling, deionized water was added to adjust the solid content to 20% by weight. Thus, a dispersion (A) of colored resin fine particles was obtained. The resin fine particles dispersed in the dispersion were fine particles of the resin colored in yellow tint, having an average particle diameter of 0.2 μm.

Evaluation of characteristics:

Glycerin and deionized water were added to the dispersion of the colored resin fine particles to obtain aqueous ink having a solid content of 15% by weight.

This aqueous ink was charged into an ink cartridge for a piezo-type ink jet printer, and printing and image recording were conducted with this printer. The tests were conducted with respect to the following items. The results are shown in Table 2.

The evaluation standards of the test items are described below.

(A) Evaluation of an Emulsion:

The condition of the emulsion in production of the emulsion ink was visually evaluated.

Evaluation Standard:

| The condition of the emulsion is good. | ⊙ |
|---|---|
| A floating matter is slightly observed, which is not actually problematic though. | ○ |
| Gelation is slightly observed, which seems likely to be problematic. | Δ |
| The condition of the emulsion is bad, and it is problematic as ink. | × |

(B) Evaluation of an Image:

An image was formed on plain paper, and a blotted condition was visually evaluated.

Evaluation Standard:

| No blotting is observed. | ⊙ |
|---|---|
| Blotting is observed without any influence on an image. | ○ |
| Blotting is notably observed. | × |

(C) Evaluation of an Image Recording Density:

The plain paper having the recorded image was measured for the recording density (OD value) using a reflection densitometer (manufactured by Macbeth) to evaluate the image recording density.

Evaluation Standard:

| The OD value is 1.1 or more. | ⊙ |
|---|---|
| The OD value is 1.0 to less than 1.1. | ○ |
| The OD value is 0.8 to less than 1.0. | Δ |
| The OD value is less than 0.8. | × |

(D) Evaluation of a Water Resistance:

With respect to the printed portion of the plain paper having the recorded image for test, the printing density (OD value) before dipping in water or after dipping in water and air-drying was measured with a reflection densitometer. The water resistance was evaluated upon comparing $OD_1$.

$OD_1$=(OD value after dipping in water and air-drying)/ (OD value before dipping in water)×100

Evaluation Standard:

| | |
|---|---|
| $OD_1$ is 90 to 100%. | ⊚⊚ |
| $OD_1$ is 80 to less than 90%. | ⊚ |
| $OD_1$ is 70 to less than 80%. | ○ |
| $OD_1$ is 50 to less than 70%. | Δ |
| $OD_1$ is less than 50%. | × |

(E) Evaluation of a Light Resistance:

A printing density (OD value) before irradiation or after 100 hours of irradiation was measured using a xenon fadeometer (manufactured by Suga Shikenki), and the light resistance was evaluated upon comparing $OD_2$.

$OD_2$=(OD value after irradiation)/(OD value before irradiation)×100

Evaluation Standard:

| | |
|---|---|
| $OD_2$ is 90 to 100%. | ⊚⊚ |
| $OD_2$ is 80 to less than 90%. | ⊚ |
| $OD_2$ is 70 to less than 80%. | ○ |
| $OD_2$ is 50 to less than 70%. | Δ |
| $OD_2$ is less than 50%. | × |

(F) Evaluation of a Storage Stability of Ink:

In order to evaluate the initial storage stability of aqueous ink (storage at 40° for 1 month) and the long-term storage stability thereof (storage at 40° C. for 3 months), the conditions of the aqueous ink after these storages were visually observed. Further, the recording was conducted continuously with the printer for a long period of time, and the clogging was observed.

(F-1) Conditions After Storage of the Ink:

Evaluation Standard:

| | |
|---|---|
| No problem without any precipitate or any floating matter. | ○ |
| A floating matter is slightly observed. | Δ |
| Problematic with a precipitate and a floating matter observed. | × |

(F-2) Clogging:

Evaluation Standard:

| | |
|---|---|
| Normal | ○ |
| Negligible level at the present stage | Δ |
| Abnormal | × |

Example 2

Production Example of a Dispersion (B) of Colored Resin Fine Particles

To an autoclave equipped with a thermometer and a stirrer, 150 parts of dimethyl terephthalate, 50 parts of dimethyl isophthalate, 5 parts of pentasodium sulfoisophthalic acid dimethyl ester, 150 parts of ethylene glycol, 250 parts of neopentyl glycol and 0.1 part of tetrabutoxytitanate, and the mixture was heated at 180 to 220° C. for approximately 3 hours for transesterification. Subsequently, the reaction mixture was heated to 240° C., the pressure in the autoclave was then lowered slowly to 10 mmHg, and the reaction was continued for 1 hour. The pressure in the autoclave was returned to atmospheric pressure to obtain a copolyester resin. Then, 100 parts of the resulting polyester resin, 150 parts of methyl ethyl ketone, 150 parts of tetrahydrofuran and 10 parts of the coloring matter for ink-jet recording indicated at No. 5 in Table 1 were mixed. Thereafter, 600 parts of deionized water was added thereto, and these were further mixed. This mixture was filtered through a 0.8 micron membrane filter, and heated to distill off the solvent. After cooling, deionized water was added to adjust the solid content to 20% by weight. Thus, a dispersion (B) of colored resin fine particles was obtained. The resin fine particles dispersed in the dispersion were fine particles of the resin colored in yellow tint, having an average particle diameter of 0.3 μm.

Glycerin and deionized water were added to the dispersion of the colored resin fine particles to obtain aqueous ink having a solid content of 15% by weight. The ink characteristics were evaluated as in Example 1, and the results are shown in Table 3.

Examples 3 to 151

Ink was produced by the process of Example 1 or 2 using the coloring matters for ink jet recording shown in Tables 1 or 2, and the ink characteristics were evaluated. The results are shown in Table 3. Incidentally, "Ink production process" in Table 3 refers to the process of Example 1 or 2.

All the aqueous inks using the coloring matters for ink jet recording of the invention were especially excellent in the water-resistance and also excellent in the long-term storage stability. Further, the recorded image was good without blotting, and excellent in the light resistance.

Comparative Example 1

Ink was produced as in Example 2 using quinophthalone-based coloring matter represented by the formula (13);

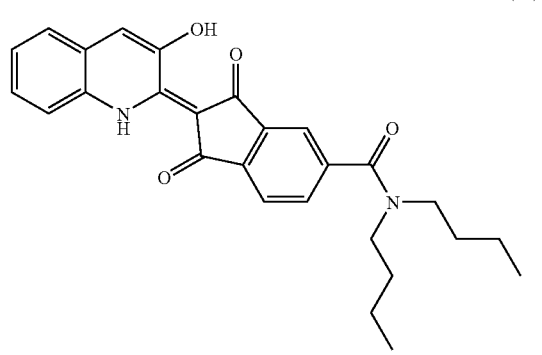

(13)

Partially insoluble matter was observed. The ink was passed through the filter to remove the insoluble matter, and the characteristics thereof were then evaluated as in Example 1. Consequently, as shown in Table 3, the coloring matter was quite worse than the coloring matters for ink jet recording of the invention.

Comparative Example 2

Ink was produced as in Example 1 using the quinophthalone compound represented by the formula (14);

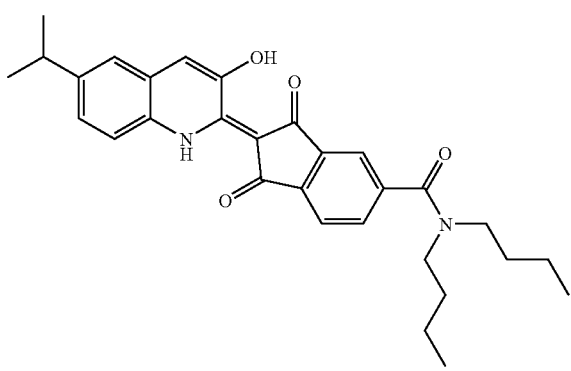

(14)

Since the solubility of the coloring matter was low, an insoluble matter was observed. The ink was passed through the filter to remove the insoluble matter, and the characteristics thereof were then evaluated as in Example 1.

Consequently, as shown in Table 3, the coloring matter was quite worse than the coloring matters for ink jet recording of the invention.

Comparative Example 3

Ink was produced as in Example 1 using oil soluble dyestuff C.I. Solvent Yellow 16;

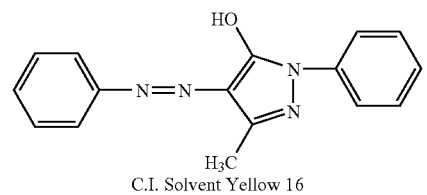

C.I. Solvent Yellow 16

Since the solubility of the coloring matter was low, an insoluble matter was observed. The ink was passed through the filter to remove the insoluble matter, and the characteristics thereof were then evaluated as in Example 1.

Consequently, as shown in Table 3, the coloring matter was quite worse than the coloring matters for ink jet recording of the invention.

TABLE 3

| Example | Coloring No. | preparation process of ink | A | B | C | D | E | F-1 (after 1 month) | F-1 (after 3 month) | F-2 (after 1 month) | F-2 (after 3 month) |
|---|---|---|---|---|---|---|---|---|---|---|---|
| 1 | 1 | Example 1 | ⊚ | ⊚ | ⊚ | ⊚○ | ⊚○ | ○ | ○ | ○ | ○ |
| 2 | 5 | Example 2 | ○ | ⊚ | ○ | ⊚ | ⊚ | ○ | Δ | ○ | Δ |
| 3 | 2 | Example 1 | ○ | ⊚ | ○ | ⊚ | ⊚○ | ○ | Δ | ○ | Δ |
| 4 | 3 | ↑ | ○ | ⊚ | Δ | ⊚ | ⊚ | ○ | Δ | ○ | Δ |
| 5 | 4 | ↑ | Δ | ⊚ | X | ⊚ | ⊚ | ○ | X | ○ | X |
| 6 | 6 | ↑ | ○ | ⊚ | Δ | ⊚ | ⊚ | ○ | Δ | ○ | Δ |
| 7 | 9 | ↑ | ○ | ⊚ | ○ | ⊚ | ⊚ | ○ | Δ | ○ | Δ |
| 8 | 12 | ↑ | ⊚ | ⊚ | ○ | ⊚○ | ⊚ | ○ | ○ | ○ | ○ |
| 9 | 13 | ↑ | Δ | ⊚ | ○ | ⊚ | ⊚ | ○ | Δ | ○ | Δ |
| 10 | 17 | ↑ | ⊚ | ⊚ | ⊚ | ⊚○ | ⊚○ | ○ | ○ | ○ | ○ |
| 11 | 19 | ↑ | Δ | ⊚ | Δ | ⊚ | ⊚ | ○ | ○ | ○ | ○ |
| 12 | 20 | ↑ | ○ | ⊚ | ○ | ⊚○ | ⊚ | ○ | ○ | ○ | ○ |
| 13 | 21 | ↑ | ⊚ | ⊚ | ⊚ | ⊚○ | ⊚○ | ○ | ○ | ○ | ○ |
| 14 | 25 | ↑ | Δ | ⊚ | ○ | ⊚ | ⊚ | ○ | Δ | ○ | Δ |
| 15 | 26 | ↑ | Δ | ⊚ | Δ | ⊚ | ⊚ | ○ | Δ | ○ | Δ |
| 16 | 2 | Example 2 | ⊚ | ⊚ | ○ | ⊚ | ⊚○ | ○ | ○ | ○ | Δ |
| 17 | 3 | ↑ | ○ | ⊚ | Δ | ⊚ | ⊚ | ○ | Δ | ○ | Δ |
| 18 | 4 | ↑ | Δ | ⊚ | X | ⊚ | ⊚ | ○ | X | ○ | X |
| 19 | 5 | ↑ | ○ | ⊚ | ○ | ⊚ | ⊚ | ○ | Δ | ○ | Δ |
| 20 | 6 | ↑ | ○ | ⊚ | Δ | ⊚ | ⊚ | ○ | Δ | ○ | Δ |
| 21 | 10 | ↑ | Δ | ⊚ | X | ⊚ | ⊚ | ○ | Δ | ○ | Δ |
| 22 | 11 | ↑ | ⊚ | ⊚ | ⊚ | ⊚○ | ⊚○ | ○ | ○ | ○ | ○ |
| 23 | 15 | ↑ | Δ | ⊚ | Δ | ⊚ | ⊚ | ○ | Δ | ○ | Δ |
| 24 | 16 | ↑ | Δ | ⊚ | Δ | ⊚ | ⊚ | ○ | Δ | ○ | Δ |
| 25 | 22 | ↑ | ○ | ⊚ | ○ | ⊚ | ⊚ | ○ | Δ | ○ | Δ |
| 26 | 23 | ↑ | Δ | ⊚ | X | ⊚ | ⊚ | ○ | X | ○ | X |
| 27 | 24 | ↑ | Δ | ⊚ | X | ⊚ | ⊚ | ○ | X | ○ | X |
| 28 | 27 | ↑ | Δ | ⊚ | Δ | ⊚ | ⊚ | ○ | Δ | ○ | Δ |
| 29 | 28 | Example 1 | ⊚ | ⊚ | ⊚ | ⊚○ | ⊚○ | ○ | ○ | ○ | ○ |
| 30 | 29 | ↑ | ⊚ | ⊚ | ⊚ | ⊚○ | ⊚○ | ○ | ○ | ○ | ○ |
| 31 | 30 | ↑ | ⊚ | ⊚ | ⊚ | ⊚○ | ⊚○ | ○ | ○ | ○ | ○ |
| 32 | 31 | ↑ | ○ | ⊚ | ○ | ⊚ | ⊚ | ○ | Δ | ○ | Δ |
| 33 | 32 | ↑ | ⊚ | ⊚ | ○ | ⊚ | ⊚○ | ○ | ○ | ○ | ○ |
| 34 | 33 | ↑ | ⊚ | ⊚ | ⊚ | ⊚○ | ⊚○ | ○ | ○ | ○ | ○ |
| 35 | 34 | ↑ | ⊚ | ⊚ | ○ | ⊚ | ⊚ | ○ | ○ | ○ | ○ |
| 38 | 35 | ↑ | ⊚ | ○ | ⊚ | ⊚ | ⊚○ | ○ | ○ | ○ | ○ |

TABLE 3-continued

| Example | Coloring No. | preparation process of ink | A | B | C | D | E | F-1 (after 1 month) | F-1 (after 3 month) | F-2 (after 1 month) | F-2 (after 3 month) |
| --- | --- | --- | --- | --- | --- | --- | --- | --- | --- | --- | --- |
| 37 | 36 | ↑ | ○ | ⊚ | ○ | ⊚ | ⊚ | ○ | △ | ○ | △ |
| 38 | 38 | Example 2 | ○ | ⊚ | △ | ⊚ | ⊚ | ○ | △ | ○ | △ |
| 39 | 41 | Example 1 | ○ | ⊚ | △ | ⊚ | ⊚ | ○ | △ | ○ | △ |
| 40 | 42 | ↑ | ○ | ⊚ | △ | ⊚ | ⊚ | ○ | △ | ○ | △ |
| 41 | 44 | ↑ | ○ | ⊚ | △ | ⊚ | ⊚ | ○ | △ | ○ | △ |
| 42 | 46 | ↑ | △ | ⊚ | △ | ⊚⊚ | ⊚ | ○ | △ | ○ | △ |
| 43 | 47 | ↑ | ○ | ⊚ | △ | ⊚⊚ | ⊚ | ○ | △ | ○ | △ |
| 44 | 49 | ↑ | ○ | ⊚ | △ | ⊚⊚ | ⊚ | ○ | ○ | ○ | ○ |
| 45 | 50 | ↑ | △ | ⊚ | △ | ⊚ | ⊚ | ○ | △ | ○ | △ |
| 46 | 52 | ↑ | △ | ⊚ | X | ⊚ | ⊚ | △ | X | ○ | X |
| 47 | 53 | ↑ | △ | ⊚ | X | ⊚ | ⊚ | △ | X | ○ | X |
| 48 | 55 | ↑ | △ | ⊚ | X | ⊚ | ⊚ | ○ | △ | ○ | △ |
| 49 | 56 | Example 2 | ○ | ⊚ | ○ | ⊚⊚ | ⊚ | ○ | ○ | ○ | ○ |
| 50 | 57 | ↑ | ○ | ⊚ | ○ | ⊚⊚ | ⊚ | ○ | ○ | ○ | ○ |
| 51 | 58 | ↑ | ○ | ⊚ | ○ | ⊚⊚ | ⊚ | ○ | ○ | ○ | ○ |
| 52 | 60 | ↑ | ○ | ⊚ | △ | ⊚⊚ | ⊚ | ○ | ○ | ○ | ○ |
| 53 | 61 | ↑ | ○ | ⊚ | ○ | ⊚⊚ | ⊚ | ○ | ○ | ○ | ○ |
| 54 | 63 | ↑ | △ | ⊚ | △ | ⊚ | ⊚ | ○ | △ | ○ | △ |
| 55 | 64 | ↑ | △ | ⊚ | △ | ⊚ | ⊚ | ○ | △ | ○ | △ |
| 56 | 65 | ↑ | △ | ⊚ | △ | ⊚ | ⊚ | ○ | X | ○ | X |
| 57 | 66 | Example 2 | △ | ⊚ | △ | ⊚ | ⊚ | ○ | △ | ○ | △ |
| 58 | 69 | Example 1 | △ | ⊚ | △ | ⊚ | ⊚ | ○ | △ | ○ | △ |
| 59 | 70 | ↑ | ⊚ | ⊚ | ⊚ | ⊚⊚ | ⊚ | ○ | ○ | ○ | ○ |
| 60 | 71 | ↑ | ⊚ | ⊚ | ⊚ | ⊚⊚ | ⊚ | ○ | ○ | ○ | ○ |
| 61 | 72 | ↑ | ⊚ | ⊚ | ⊚ | ⊚⊚ | ⊚ | ○ | ○ | ○ | ○ |
| 62 | 73 | ↑ | ○ | ⊚ | ○ | ⊚⊚ | ⊚ | ○ | ○ | ○ | ○ |
| 63 | 74 | ↑ | ○ | ⊚ | ○ | ⊚⊚ | ⊚ | ○ | ○ | ○ | ○ |
| 64 | 75 | ↑ | ○ | ⊚ | ○ | ⊚⊚ | ⊚ | ○ | △ | ○ | △ |
| 65 | 76 | ↑ | △ | ⊚ | △ | ⊚ | ⊚ | △ | X | ○ | X |
| 66 | 78 | ↑ | △ | ⊚ | △ | ⊚ | ⊚ | ○ | △ | ○ | △ |
| 67 | 79 | ↑ | △ | ⊚ | △ | ⊚ | ⊚ | ○ | X | ○ | X |
| 68 | 81 | Example 2 | △ | ⊚ | △ | ⊚ | ⊚ | ○ | X | ○ | X |
| 69 | 82 | ↑ | ⊚ | ⊚ | ○ | ⊚⊚ | ⊚ | ○ | ○ | ○ | ○ |
| 70 | 83 | ↑ | ○ | ⊚ | ○ | ⊚⊚ | ⊚ | ○ | ○ | ○ | ○ |
| 71 | 84 | ↑ | ⊚ | ⊚ | ⊚ | ⊚⊚ | ⊚ | ○ | ○ | ○ | ○ |
| 72 | 85 | ↑ | ⊚ | ⊚ | ⊚ | ⊚⊚ | ⊚ | ○ | ○ | ○ | ○ |
| 73 | 88 | ↑ | ○ | ⊚ | ○ | ⊚⊚ | ⊚ | ○ | ○ | ○ | ○ |
| 74 | 91 | ↑ | ○ | ⊚ | ○ | ⊚⊚ | ⊚ | ○ | ○ | ○ | ○ |
| 75 | 94 | ↑ | ⊚ | ⊚ | ⊚ | ⊚⊚ | ⊚ | ○ | ○ | ○ | ○ |
| 76 | 95 | ↑ | ○ | ⊚ | ⊚ | ⊚⊚ | ⊚ | ○ | ○ | ○ | ○ |
| 77 | 101 | Example 1 | ○ | ⊚ | △ | ⊚ | ⊚ | ○ | △ | ○ | △ |
| 78 | 102 | ↑ | ○ | ⊚ | △ | ⊚ | ⊚ | ○ | △ | ○ | △ |
| 79 | 103 | ↑ | △ | ⊚ | △ | ⊚⊚ | ⊚ | ○ | △ | ○ | △ |
| 80 | 104 | ↑ | △ | ⊚ | X | ⊚ | ⊚ | ○ | X | ○ | X |
| 81 | 105 | ↑ | ○ | ⊚ | ○ | ⊚⊚ | ⊚ | ○ | ○ | ○ | ○ |
| 82 | 106 | ↑ | △ | ⊚ | △ | ⊚ | ⊚ | ○ | △ | ○ | △ |
| 83 | 107 | ↑ | △ | ⊚ | △ | ⊚ | ⊚ | ○ | △ | ○ | △ |
| 84 | 108 | ↑ | △ | ⊚ | △ | ⊚ | ⊚ | ○ | X | ○ | X |
| 85 | 109 | Example 1 | △ | ⊚ | △ | ⊚ | ⊚ | ○ | △ | ○ | △ |
| 86 | 110 | ↑ | ⊚ | ⊚ | ⊚ | ⊚⊚ | ⊚ | ○ | ○ | ○ | ○ |
| 87 | 111 | ↑ | ○ | ⊚ | ○ | ⊚⊚ | ⊚ | ○ | ○ | ○ | ○ |
| 88 | 112 | ↑ | ⊚ | ⊚ | ○ | ⊚⊚ | ⊚ | ○ | ○ | ○ | ○ |
| 89 | 113 | ↑ | ⊚ | ⊚ | ⊚ | ⊚⊚ | ⊚ | ○ | ○ | ○ | ○ |
| 90 | 114 | ↑ | ⊚ | ⊚ | ⊚ | ⊚⊚ | ⊚⊚ | ○ | ○ | ○ | ○ |
| 91 | 115 | ↑ | ⊚ | ⊚ | ⊚ | ⊚⊚ | ⊚⊚ | ○ | ○ | ○ | ○ |
| 92 | 116 | ↑ | ⊚ | ⊚ | ⊚ | ⊚⊚ | ⊚⊚ | ○ | ○ | ○ | ○ |
| 93 | 133 | ↑ | ⊚ | ⊚ | ⊚ | ⊚⊚ | ⊚ | ○ | ○ | ○ | ○ |
| 94 | 134 | ↑ | ⊚ | ⊚ | ⊚ | ⊚⊚ | ⊚⊚ | ○ | ○ | ○ | ○ |
| 95 | 135 | ↑ | ⊚ | ⊚ | ⊚ | ⊚⊚ | ⊚⊚ | ○ | ○ | ○ | ○ |
| 96 | 121 | ↑ | ⊚ | ⊚ | ⊚ | ⊚⊚ | ⊚ | ○ | ○ | ○ | ○ |
| 97 | 122 | ↑ | ⊚ | ⊚ | ⊚ | ⊚⊚ | ⊚⊚ | ○ | ○ | ○ | ○ |
| 98 | 123 | ↑ | ⊚ | ⊚ | ⊚ | ⊚⊚ | ⊚⊚ | ○ | ○ | ○ | ○ |
| 99 | 117 | ↑ | ⊚ | ⊚ | ⊚ | ⊚⊚ | ⊚ | ○ | ○ | ○ | ○ |
| 100 | 118 | ↑ | ⊚ | ⊚ | ⊚ | ⊚⊚ | ⊚⊚ | ○ | ○ | ○ | ○ |
| 101 | 119 | ↑ | ⊚ | ⊚ | ⊚ | ⊚⊚ | ⊚⊚ | ○ | ○ | ○ | ○ |
| 102 | 124 | ↑ | ⊚ | ⊚ | ⊚ | ⊚⊚ | ⊚ | ○ | ○ | ○ | ○ |
| 103 | 125 | ↑ | ⊚ | ⊚ | ⊚ | ⊚⊚ | ⊚⊚ | ○ | ○ | ○ | ○ |

TABLE 3-continued

| Example | Coloring No. | preparation process of ink | A | B | C | D | E | F-1 (after 1 month) | F-1 (after 3 month) | F-2 (after 1 month) | F-2 (after 3 month) |
|---|---|---|---|---|---|---|---|---|---|---|---|
| 104 | 128 | ↑ | ◎ | ◎ | ◎ | ◎◎ | ◎ | ○ | ○ | ○ | ○ |
| 105 | 129 | ↑ | ◎ | ◎ | ◎ | ◎◎ | ◎◎ | ○ | ○ | ○ | ○ |
| 106 | 130 | ↑ | ◎ | ◎ | ◎ | ◎◎ | ◎◎ | ○ | ○ | ○ | ○ |
| 107 | 131 | ↑ | ◎ | ◎ | ◎ | ◎◎ | ◎◎ | ○ | ○ | ○ | ○ |
| 108 | 132 | ↑ | ◎ | ◎ | ◎ | ◎◎ | ◎◎ | ○ | ○ | ○ | ○ |
| 109 | 120 | ↑ | ◎ | ◎ | ◎ | ◎◎ | ◎ | ○ | ○ | ○ | ○ |
| 110 | 126 | ↑ | ◎ | ◎ | ◎ | ◎◎ | ◎◎ | ○ | ○ | ○ | ○ |
| 111 | 127 | ↑ | ◎ | ◎ | ◎ | ◎◎ | ◎◎ | ○ | ○ | ○ | ○ |
| 112 | 138 | ↑ | ○ | ◎ | Δ | ◎ | ◎ | ○ | Δ | ○ | Δ |
| 113 | 142 | Example 2 | ○ | ◎ | Δ | ◎ | ◎ | ○ | Δ | ○ | Δ |
| 114 | 143 | Example 1 | ○ | ◎ | ○ | ◎ | ◎ | ○ | Δ | ○ | Δ |
| 115 | 144 | ↑ | ○ | ◎ | ○ | ◎ | ◎ | ○ | Δ | ○ | Δ |
| 116 | 146 | ↑ | ○ | ◎ | ○ | ◎ | ◎ | ○ | Δ | ○ | Δ |
| 117 | 148 | ↑ | ○ | ◎ | Δ | ◎ | ◎ | ○ | Δ | ○ | Δ |
| 118 | 149 | ↑ | ○ | ◎ | ○ | ◎ | ◎ | ○ | ○ | ○ | ○ |
| 119 | 151 | ↑ | Δ | ◎ | Δ | ◎ | ◎ | ○ | X | ○ | X |
| 120 | 152 | ↑ | Δ | ◎ | ○ | ◎ | ◎ | ○ | Δ | ○ | Δ |
| 121 | 154 | ↑ | ○ | ◎ | ○ | ◎ | ◎ | ○ | Δ | ○ | Δ |
| 122 | 155 | ↑ | Δ | ◎ | ○ | ◎ | ◎ | ○ | Δ | ○ | Δ |
| 123 | 157 | ↑ | ○ | ◎ | ◎ | ◎◎ | ◎ | ○ | ○ | ○ | Δ |
| 124 | 158 | Example 2 | Δ | ◎ | ○ | ◎ | ◎ | ○ | Δ | ○ | Δ |
| 125 | 159 | ↑ | Δ | ◎ | ○ | ◎ | ◎ | ○ | Δ | ○ | Δ |
| 126 | 160 | ↑ | Δ | ◎ | Δ | ◎ | ◎ | ○ | Δ | ○ | X |
| 127 | 162 | ↑ | Δ | ◎ | ○ | ◎ | ◎ | ○ | Δ | ○ | Δ |
| 128 | 163 | ↑ | Δ | ◎ | ○ | ◎ | ◎ | ○ | Δ | ○ | Δ |
| 129 | 165 | ↑ | Δ | ◎ | ○ | ◎ | ◎ | ○ | Δ | ○ | Δ |
| 130 | 166 | ↑ | Δ | ◎ | Δ | ◎ | ◎ | ○ | X | ○ | X |
| 131 | 167 | ↑ | Δ | ◎ | Δ | ◎ | ◎ | ○ | X | ○ | X |
| 132 | 168 | ↑ | Δ | ◎ | Δ | ◎ | ◎ | ○ | Δ | ○ | Δ |
| 133 | 171 | Example 1 | Δ | ◎ | Δ | ◎ | ◎ | ○ | Δ | ○ | Δ |
| 134 | 172 | ↑ | Δ | ◎ | Δ | ◎ | ◎ | ○ | Δ | ○ | X |
| 135 | 173 | ↑ | Δ | ◎ | Δ | ◎ | ◎ | ○ | Δ | ○ | X |
| 136 | 174 | ↑ | Δ | ◎ | Δ | ◎ | ◎ | ○ | Δ | ○ | X |
| 137 | 175 | ↑ | Δ | ◎ | X | ◎ | ◎ | ○ | X | ○ | X |
| 138 | 176 | ↑ | Δ | ◎ | X | ◎ | ◎ | ○ | X | ○ | X |
| 139 | 177 | ↑ | ○ | ◎ | Δ | ◎ | ◎ | ○ | Δ | ○ | Δ |
| 140 | 178 | ↑ | Δ | ◎ | Δ | ◎ | ◎ | ○ | Δ | ○ | Δ |
| 141 | 180 | Example 1 | ○ | ◎ | ○ | ◎ | ◎ | ○ | Δ | ○ | Δ |
| 142 | 181 | ↑ | ○ | ◎ | ○ | ◎ | ◎ | ○ | Δ | ○ | Δ |
| 143 | 183 | Example 2 | ○ | ◎ | ○ | ◎ | ◎ | ○ | Δ | ○ | Δ |
| 144 | 184 | ↑ | ◎ | ◎ | ◎ | ◎◎ | ◎ | ○ | ○ | ○ | ○ |
| 145 | 187 | ↑ | ◎ | ◎ | ○ | ◎ | ◎ | ○ | ○ | ○ | ○ |
| 146 | 188 | ↑ | ○ | ◎ | Δ | ◎ | ◎ | ○ | ○ | ○ | Δ |
| 147 | 189 | ↑ | ○ | ◎ | ○ | ◎ | ◎ | ○ | ○ | ○ | ○ |
| 148 | 190 | ↑ | ◎ | ◎ | ○ | ◎ | ◎ | ○ | ○ | ○ | ○ |
| 149 | 191 | ↑ | ◎ | ◎ | ◎ | ◎◎ | ◎ | ○ | ○ | ○ | ○ |
| 150 | 192 | ↑ | ◎ | ◎ | ◎ | ◎◎ | ◎ | ○ | ○ | ○ | ○ |
| 151 | 193 | ↑ | ○ | ◎ | ○ | ◎ | ◎ | ○ | Δ | ○ | Δ |
| Compara. Exam. 1 | Formula (13) | ↑ | X | ○ | X | ○ | ◎ | X | X | X | X |
| Compara. Exam. 2 | Formula (14) | Example 1 | X | ○ | X | ○ | ○ | X | X | X | X |
| Compara. Exam. 3 | C.I. Solvent Yellow 16 | ↑ | X | ○ | X | ○ | X | X | X | X | X |

POSSIBILITY FOR UTILIZATION IN INDUSTRY

The coloring matter for ink-jet recording of the present invention is excellent in water-resistance in particular, and further is excellent in light resistance and compatibility with a resin. Ink for ink-jet recording prepared using the coloring matter has excellent properties in light resistance and storage stability.

The ink of the present invention, when it was used for ink-jet recording system, enables formation of a high quality image without blotting, and obtained recording image has excellent characters in water-resistance

The invention claimed is:

1. An aqueous ink for ink-jet recording comprising water and a resin as an emulsion, wherein the resin is colored with a pyridone azo compound represented by the formula (2);

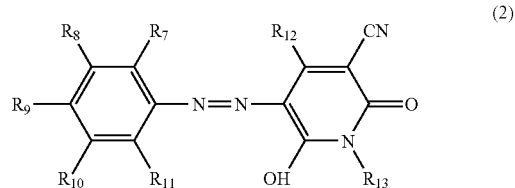

wherein each of $R_7$ to $R_{11}$ independently, represents a hydrogen atom, a halogen atom, an unsubstituted or substituted alkyl group, an aralkyl group, an unsubstituted or substituted alkoxy group, an unsubstituted or substituted aryl group, an unsubstituted or substituted aryloxy group, a hydroxyl group, —$NR_{14}R_{15}$ in which each of $R_{14}$ and $R_{15}$ independently, represents a hydrogen atom, an unsubstituted or substituted alkyl group, or an aralkyl group, —$COX_1$ in which $X_1$ represents an unsubstituted or substituted alkoxy group, an unsubstituted or substituted aryloxy group, or —$NR_{16}R_{17}$ in which each of $R_{16}$ and $R_{17}$ independently, represents a hydrogen atom, an unsubstituted or substituted alkyl group, an aralkyl group, or an unsubstituted or substituted aryl group, —$COO(CH_2)_n$—$COX_2$, —$OCOX_3$, or —$NHCOX_4$, in which $X_2$ to $X_4$ represents an unsubstituted or substituted alkyl group, an aralkyl group, an unsubstituted or substituted aryl group, an unsubstituted or substituted alkoxy group, or an unsubstituted or substituted aryloxy group, and n is an integer of 1 to 3, provided that at least one of $R_7$ to $R_9$ is —$CONR_{16}R_{17}$ having 17 or more carbon atoms, $R_{12}$ represents a linear or branched alkyl group having 4 or more carbon atoms, $R_{13}$ represents a linear or branched alkyl group having 8 or more carbon atoms.

2. A pyridone azo compound represented by the formula (2);

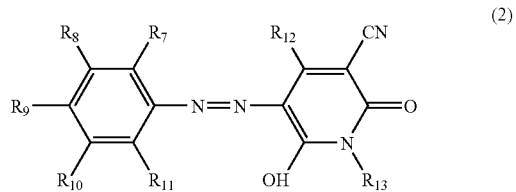

wherein each of $R_7$ to $R_{11}$ independently, represents a hydrogen atom, a halogen atom, an unsubstituted or substituted alkyl group, an aralkyl group, an unsubstituted or substituted alkoxy group, an unsubstituted or substituted aryl group, an unsubstituted or substituted aryloxy group, a hydroxyl group, —$NR_{14}R_{15}$ in which each of $R_{14}$ and $R_{15}$ independently, represents a hydrogen atom, an unsubstituted or substituted alkyl group, or an aralkyl group, —$COX_1$ in which $X_1$ represents an unsubstituted or substituted alkoxy group, an unsubstituted or substituted aryloxy group, or —$NR_{16}R_{17}$ in which $R_{16}$ and $R_{17}$ independently, represents a hydrogen atom, an unsubstituted or substituted alkyl group, an aralkyl group, or an unsubstituted or substituted aryl group, —$COO(CH_2)_n$—$COX_2$, —$OCOX_3$, or —$NHCOX_4$ in which $X_2$ to $X_4$ represents an unsubstituted or substituted alkyl group, an aralkyl group, an unsubstituted or substituted aryl group, an unsubstituted or substituted alkoxy group, or an unsubstituted or substituted aryloxy group, and n is an integer of 1 to 3, provided that at least one of $R_7$ to $R_9$ is —$CONR_{16}R_{17}$ having 17 or more carbon atoms, $R_{12}$ represents a linear or branched alkyl group having 4 or more carbon atoms, $R_{13}$ represents a linear or branched alkyl group having 8 or more carbon atoms.

* * * * *